US012531015B2

(12) United States Patent
Wen et al.

(10) Patent No.: US 12,531,015 B2
(45) Date of Patent: Jan. 20, 2026

(54) COMPENSATING FOR NON-UNIFORM LUMINANCE IN CURVED-EDGE DISPLAYS

(71) Applicant: Google LLC, Mountain View, CA (US)

(72) Inventors: Chien-Hui Wen, Cupertino, CA (US); Yi Tao, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/126,874

(22) Filed: Mar. 27, 2023

(65) Prior Publication Data

US 2023/0351952 A1 Nov. 2, 2023

Related U.S. Application Data

(63) Continuation of application No. PCT/US2022/072042, filed on May 2, 2022.

(51) Int. Cl.
*G09G 3/3208* (2016.01)
*G09G 3/00* (2006.01)

(52) U.S. Cl.
CPC ........... *G09G 3/3208* (2013.01); *G09G 3/035* (2020.08); *G09G 2320/0233* (2013.01); *G09G 2320/0626* (2013.01)

(58) Field of Classification Search
CPC ................. G09G 3/3208; G09G 3/035; G09G 2320/0233; G09G 2320/0626;

(Continued)

(56) References Cited

U.S. PATENT DOCUMENTS 5,491,568 A 2/1996 Wan
6,476,783 B2 * 11/2002 Matthies ................ H10K 59/18 345/82

(Continued)

FOREIGN PATENT DOCUMENTS

CN 107211076 9/2017
CN 109981839 7/2019

(Continued)

OTHER PUBLICATIONS

"CIE 1931 color space—Wikipedia", Retrieved at: https://en.wikipedia.org/wiki/CIE_1931_color_space—on Feb. 7, 2023, 16 pages.

(Continued)

*Primary Examiner* — Michael J Jansen, II
(74) *Attorney, Agent, or Firm* — Colby Nipper PLLC

(57) ABSTRACT

This document describes systems and techniques directed at compensating for non-uniform luminance in curved-edge displays. In aspects, a computing device having a curved-edge display and a luminance manager is configured to receive an indication of a luminance that is, or is intended to be, displayed by pixels of the curved-edge display. Responsive to and based on the received indication of the luminance and a non-uniform luminance, the luminance manager determines a luminance modification for the pixels of the curved-edge display. Based on the determined luminance modification, the luminance manager modifies the luminance that is displayed or modifies the intended luminance that is intended to be displayed by pixels of the curved-edge display effective to compensate for the non-uniform luminance.

22 Claims, 10 Drawing Sheets

(58) Field of Classification Search
CPC ......... G09G 2360/147; G09G 2380/02; G09G 3/03; G09G 2320/0285
See application file for complete search history.

(56) References Cited

U.S. PATENT DOCUMENTS 6,954,193 B1 10/2005 Andrade et al.
7,123,223 B2 10/2006 Moon
7,126,611 B1 10/2006 Weed
7,142,185 B2 * 11/2006 Aoki .................... G09G 3/3648 345/55
7,616,361 B2 * 11/2009 Takahashi ............ H04N 1/6058 358/1.9
7,697,165 B2 4/2010 Osaki et al.
7,728,845 B2 6/2010 Holub
7,844,109 B2 11/2010 Matsuura
7,940,434 B2 5/2011 Inoue
8,045,796 B2 10/2011 Matsuoka et al.
8,345,177 B2 * 1/2013 Chang ............... G02F 1/136227 349/42
8,441,691 B2 5/2013 Mestha et al.
8,558,765 B2 * 10/2013 Cok ..................... G09G 3/3225 345/82
8,610,822 B2 12/2013 Weber et al.
8,638,340 B2 1/2014 Holub
8,654,142 B2 * 2/2014 Beeman ............... G09G 3/3607 345/589
8,711,314 B2 * 4/2014 Kimura ................. H01L 27/124 349/48
8,870,393 B2 10/2014 Kawahara
8,890,908 B2 * 11/2014 Wu ......................... G09G 5/02 358/3.32
9,019,194 B2 * 4/2015 Seo ........................ G09G 3/342 345/102
9,117,405 B2 * 8/2015 Kim ..................... G09G 3/3225
9,336,705 B2 * 5/2016 Inoue ................... G09G 3/3208
9,552,778 B2 * 1/2017 Lee ...................... G09G 3/2092
9,570,019 B2 2/2017 Musgrave et al.
9,576,544 B2 * 2/2017 Park ..................... G09G 3/3677
9,583,050 B2 * 2/2017 Hsieh ................... G09G 3/3406
9,685,106 B2 * 6/2017 Cha .......................... G09G 3/20
9,697,758 B2 7/2017 Watanabe et al.
9,741,099 B2 * 8/2017 Lim ........................ G06T 5/001
9,754,522 B2 9/2017 Park et al.
9,780,159 B2 * 10/2017 Mathew ............... H10K 50/865
9,858,640 B1 1/2018 Earl et al.
9,865,202 B2 * 1/2018 Kobayashi ........... G09G 3/3607
9,905,199 B2 * 2/2018 Liu .......................... G09G 5/12
9,933,887 B2 4/2018 Choi
9,934,595 B2 * 4/2018 Safaee-Rad ............. G01J 3/462
9,934,742 B2 * 4/2018 Yoshida ................... G09G 5/10
9,997,135 B2 * 6/2018 Sullivan ................... G09G 5/02
10,019,121 B2 7/2018 Choi et al.
10,021,226 B2 7/2018 Gagne-keats et al.
10,032,430 B2 * 7/2018 Huang ..................... G09G 5/00
10,068,551 B1 9/2018 Choi et al.
10,102,793 B2 * 10/2018 Jang ....................... G11C 19/28
10,185,064 B2 * 1/2019 Powell .................. G06F 1/1694
10,203,433 B2 * 2/2019 Yoon .................... H10K 50/858
10,290,275 B2 * 5/2019 Du ....................... G09G 3/3677
10,424,269 B2 9/2019 Chen et al.
10,440,839 B2 10/2019 Cheng
10,453,423 B2 10/2019 Nasiriavanaki et al.
10,467,964 B2 * 11/2019 Gupta .................. G09G 3/3233
10,467,985 B2 * 11/2019 Aflatooni ........... G06V 40/1318
10,510,317 B2 12/2019 Spence et al.
10,593,251 B2 * 3/2020 Shigeta ................ G09G 3/2018
10,666,292 B2 * 5/2020 Deng .................. H03M 7/3071
10,679,544 B2 * 6/2020 Van Belle ................ G09G 5/10
10,742,788 B2 8/2020 Shin et al.
10,748,492 B2 * 8/2020 Takasugi .............. G09G 3/3233
10,770,035 B2 * 9/2020 Giusti ................... H04M 1/724
10,777,621 B2 9/2020 Lee et al.
10,810,930 B2 * 10/2020 Shim .................... G09G 3/3233
10,818,210 B2 * 10/2020 Ma ........................... G09G 3/20
10,838,452 B2 11/2020 Siddiqui et al.
10,841,615 B2 * 11/2020 He ....................... H04N 19/597
10,861,416 B2 * 12/2020 Kim ......................... G09G 5/06
10,890,954 B2 1/2021 Evans et al.
10,937,843 B2 * 3/2021 Ding ..................... G06F 3/0446
10,949,958 B2 * 3/2021 Barron ....................... G06T 7/90
10,950,201 B2 * 3/2021 Wang ..................... G06V 40/12
10,997,914 B1 5/2021 Hwang et al.
11,017,715 B2 * 5/2021 Wang ................... G09G 3/3208
11,056,036 B2 * 7/2021 Jeon ..................... G09G 3/2003
11,069,323 B2 * 7/2021 Her ...................... G09G 3/3233
11,096,259 B2 * 8/2021 Degris ..................... G09G 5/10
11,163,970 B1 11/2021 Sammoura et al.
11,164,540 B2 * 11/2021 Holland ............... G09G 3/3208
11,183,095 B2 * 11/2021 Ranjan ..................... G09G 3/20
11,243,609 B2 * 2/2022 Ogasawara ............ G09G 3/002
11,403,984 B2 8/2022 Jung et al.
11,412,120 B2 8/2022 Manea et al.
11,594,582 B2 * 2/2023 Han ................... G06V 40/1318
11,694,601 B2 * 7/2023 Hussell ................ H05B 45/325 257/99
11,749,145 B2 * 9/2023 Agahian .................. G09G 5/06 345/694
11,782,483 B2 10/2023 Lonbardi et al.
11,842,678 B2 * 12/2023 Wen ..................... G09G 3/3225
12,029,071 B2 7/2024 Tao et al.
12,116,308 B2 * 10/2024 Qin ....................... C03C 21/002
12,366,890 B2 * 7/2025 Kuon .................... G06F 1/1652
2002/0050958 A1 5/2002 Matthies et al.
2002/0067326 A1 * 6/2002 Aoki .................... G09G 3/3648 345/89
2002/0149575 A1 * 10/2002 Moon ................. G09G 3/3696 345/204
2005/0063585 A1 * 3/2005 Matsuura ............. H04N 1/6033 382/162
2006/0093928 A1 5/2006 Hung et al.
2006/0124209 A1 6/2006 Schroers et al.
2006/0204083 A1 9/2006 Takahashi
2006/0280360 A1 * 12/2006 Holub ................... G01J 3/0264 382/162
2007/0058183 A1 * 3/2007 Osaki ....................... H04N 9/67 358/1.9
2007/0070272 A1 3/2007 Gettemy et al.
2007/0153020 A1 * 7/2007 Inoue .................. H04N 1/6019 345/591
2008/0055210 A1 * 3/2008 Cok ....................... G09G 3/006 345/77
2008/0055334 A1 * 3/2008 Matsuoka ............ H04N 1/6052 345/601
2008/0062102 A1 3/2008 Ichiraku et al.
2008/0123032 A1 5/2008 Taniguchi et al.
2010/0013750 A1 1/2010 Kerofsky et al.
2010/0053853 A1 3/2010 Allore et al.
2010/0060667 A1 3/2010 Chen et al.
2010/0207860 A1 8/2010 Chang et al.
2011/0001881 A1 * 1/2011 Kawahara ............ H04N 9/3191 348/E9.037
2011/0175852 A1 7/2011 Goertz et al.
2011/0255000 A1 10/2011 Weber et al.
2011/0299128 A1 * 12/2011 Mestha ................ H04N 1/6025 358/3.26
2012/0013635 A1 1/2012 Beeman et al.
2012/0120098 A9 5/2012 Faulkner et al.
2012/0147291 A1 6/2012 Seo
2013/0088671 A1 4/2013 Drzaic et al.
2013/0100150 A1 4/2013 Kurikko
2013/0135272 A1 5/2013 Park
2013/0256672 A1 * 10/2013 Kimura ............... H01L 27/1225 257/71
2013/0314447 A1 11/2013 Wu et al.
2013/0342519 A1 12/2013 Kim et al.
2014/0016076 A1 1/2014 Braganza et al.
2014/0118985 A1 5/2014 Hassember
2014/0176623 A1 * 6/2014 Inoue .................. G09G 3/2003 345/690
2014/0218321 A1 8/2014 Lee et al.
2014/0240911 A1 8/2014 Cole et al.

(56) References Cited

U.S. PATENT DOCUMENTS

| | | | | |
|---|---|---|---|---|
| 2014/0265822 | A1 | 9/2014 | Drzaic et al. | |
| 2014/0267370 | A1 | 9/2014 | Albrecht et al. | |
| 2014/0267448 | A1 | 9/2014 | Albrecht et al. | |
| 2014/0292628 | A1 | 10/2014 | Park | |
| 2015/0070826 | A1 | 3/2015 | Montevirgen et al. | |
| 2015/0138434 | A1 | 5/2015 | Chuang et al. | |
| 2015/0287352 | A1 | 10/2015 | Watanabe et al. | |
| 2015/0301417 | A1 | 10/2015 | Park et al. | |
| 2015/0331292 | A1 | 11/2015 | Yang et al. | |
| 2015/0348246 | A1* | 12/2015 | Lim | G06T 5/003 382/167 |
| 2016/0027364 | A1* | 1/2016 | Park | G09G 3/03 345/690 |
| 2016/0063933 | A1 | 3/2016 | Kobayashi et al. | |
| 2016/0078838 | A1 | 3/2016 | Huang et al. | |
| 2016/0078846 | A1 | 3/2016 | Liu et al. | |
| 2016/0117994 | A1 | 4/2016 | Lee | |
| 2016/0196778 | A1 | 7/2016 | Cha | |
| 2016/0210907 | A1 | 7/2016 | Hsieh et al. | |
| 2016/0210923 | A1 | 7/2016 | Yoshida et al. | |
| 2016/0218151 | A1 | 7/2016 | Kwon et al. | |
| 2016/0227654 | A1 | 8/2016 | Kim et al. | |
| 2016/0231850 | A1* | 8/2016 | Choi | G06F 1/1694 |
| 2016/0259518 | A1 | 9/2016 | King et al. | |
| 2016/0282987 | A1 | 9/2016 | Choi et al. | |
| 2016/0293085 | A1 | 10/2016 | Herranz et al. | |
| 2016/0337570 | A1 | 11/2016 | Tan et al. | |
| 2017/0004753 | A1 | 1/2017 | Kim et al. | |
| 2017/0004760 | A1 | 1/2017 | Jang et al. | |
| 2017/0062547 | A1 | 3/2017 | Mathew et al. | |
| 2017/0092196 | A1 | 3/2017 | Gupta et al. | |
| 2017/0098429 | A1 | 4/2017 | Sullivan et al. | |
| 2017/0116932 | A1 | 4/2017 | Musgrave et al. | |
| 2017/0140556 | A1 | 5/2017 | Safaee-Rad et al. | |
| 2017/0168463 | A1 | 6/2017 | Hong et al. | |
| 2017/0192140 | A1 | 7/2017 | Yoon et al. | |
| 2017/0287992 | A1 | 10/2017 | Kwak et al. | |
| 2017/0322357 | A1 | 11/2017 | De Jong et al. | |
| 2017/0352322 | A1* | 12/2017 | Spence | H04N 7/0127 |
| 2017/0374749 | A1 | 12/2017 | Lee et al. | |
| 2018/0033396 | A1* | 2/2018 | Nasiriavanaki | G09G 5/06 |
| 2018/0075798 | A1 | 3/2018 | Nho et al. | |
| 2018/0095502 | A1 | 4/2018 | Yamazaki et al. | |
| 2018/0113241 | A1 | 4/2018 | Powell et al. | |
| 2018/0151109 | A1 | 5/2018 | Shim et al. | |
| 2018/0182353 | A1* | 6/2018 | Chen | G09G 5/022 |
| 2018/0260602 | A1 | 9/2018 | He et al. | |
| 2018/0277051 | A1 | 9/2018 | Du | |
| 2018/0301080 | A1 | 10/2018 | Shigeta et al. | |
| 2018/0350313 | A1 | 12/2018 | Nambi et al. | |
| 2019/0027082 | A1 | 1/2019 | Belle | |
| 2019/0051230 | A1 | 2/2019 | Homin et al. | |
| 2019/0052904 | A1* | 2/2019 | He | H04N 19/176 |
| 2019/0123112 | A1 | 4/2019 | Lee et al. | |
| 2019/0132001 | A1* | 5/2019 | Deng | G09G 3/3208 |
| 2019/0147832 | A1 | 5/2019 | Kim et al. | |
| 2019/0180691 | A1 | 6/2019 | Takasugi | |
| 2019/0228740 | A1 | 7/2019 | Aflatooni et al. | |
| 2019/0303639 | A1 | 10/2019 | He et al. | |
| 2020/0051225 | A1 | 2/2020 | Barron et al. | |
| 2020/0066236 | A1 | 2/2020 | Giusti et al. | |
| 2020/0117933 | A1 | 4/2020 | Chang et al. | |
| 2020/0193898 | A1 | 6/2020 | Wang et al. | |
| 2020/0251033 | A1 | 8/2020 | Ma et al. | |
| 2020/0273427 | A1 | 8/2020 | Wang | |
| 2020/0273919 | A1 | 8/2020 | Ding et al. | |
| 2020/0312231 | A1 | 10/2020 | Hussell | |
| 2020/0314985 | A1* | 10/2020 | Degris | G09G 3/36 |
| 2020/0402478 | A1 | 12/2020 | Her et al. | |
| 2020/0403186 | A1 | 12/2020 | Choi et al. | |
| 2021/0005158 | A1 | 1/2021 | Huang et al. | |
| 2021/0020698 | A1 | 1/2021 | Xianyu et al. | |
| 2021/0116998 | A1* | 4/2021 | Ogasawara | G09G 5/373 |
| 2021/0183333 | A1* | 6/2021 | Holland | G09G 3/3208 |
| 2021/0192984 | A1 | 6/2021 | Yoo et al. | |
| 2021/0201731 | A1 | 7/2021 | Ranjan et al. | |
| 2021/0286407 | A1 | 9/2021 | Kim et al. | |
| 2021/0297563 | A1 | 9/2021 | Manea et al. | |
| 2021/0408140 | A1 | 12/2021 | Han et al. | |
| 2022/0043488 | A1 | 2/2022 | Lombardi et al. | |
| 2022/0044629 | A1 | 2/2022 | Wen et al. | |
| 2022/0050506 | A1 | 2/2022 | Gehlen et al. | |
| 2022/0058254 | A1 | 2/2022 | Park et al. | |
| 2022/0091637 | A1* | 3/2022 | Kuon | G06F 1/1656 |
| 2022/0103672 | A1 | 3/2022 | Jung et al. | |
| 2022/0130308 | A1 | 4/2022 | Jung et al. | |
| 2022/0223076 | A1 | 7/2022 | Agahian et al. | |
| 2022/0270550 | A1 | 8/2022 | Choi et al. | |
| 2022/0358877 | A1* | 11/2022 | Hack | G06V 10/82 |
| 2023/0088192 | A1* | 3/2023 | Qin | C03C 21/002 428/216 |
| 2023/0161390 | A1 | 5/2023 | Silvanto et al. | |
| 2023/0222950 | A1 | 7/2023 | Zhang | |
| 2023/0274678 | A1 | 8/2023 | Wen et al. | |
| 2023/0298505 | A1 | 9/2023 | Choi et al. | |
| 2023/0306912 | A1 | 9/2023 | Wen et al. | |
| 2023/0343267 | A1 | 10/2023 | Wen | |
| 2023/0351952 | A1* | 11/2023 | Wen | G09G 3/035 |
| 2023/0393618 | A1 | 12/2023 | Park et al. | |
| 2024/0029684 | A1 | 1/2024 | Sun et al. | |
| 2024/0094969 | A1 | 3/2024 | Hershey et al. | |
| 2024/0105142 | A1 | 3/2024 | Jeon et al. | |
| 2024/0129401 | A1 | 4/2024 | Park et al. | |
| 2024/0179859 | A1 | 5/2024 | Liu et al. | |
| 2024/0248512 | A1 | 7/2024 | Tang et al. | |
| 2024/0298509 | A1 | 9/2024 | Gong et al. | |
| 2025/0014494 | A1 | 1/2025 | Choi et al. | |

FOREIGN PATENT DOCUMENTS

| | | | |
|---|---|---|---|
| CN | 110310596 | A | 10/2019 |
| CN | 111241890 | | 6/2020 |
| CN | 111477135 | | 7/2020 |
| CN | 112288661 | A | 1/2021 |
| CN | 112331145 | | 2/2021 |
| CN | 113053306 | | 6/2021 |
| CN | 114153093 | | 3/2022 |
| CN | 114913773 | | 8/2022 |
| CN | 115035851 | A | 9/2022 |
| CN | 117119088 | | 11/2023 |
| CN | 117351895 | A | 1/2024 |
| EP | 2993871 | | 3/2016 |
| EP | 3399728 | | 11/2018 |
| JP | 2013106347 | | 5/2013 |
| KR | 20060124209 | | 12/2006 |
| KR | 20120120098 | | 11/2012 |
| KR | 20160080768 | | 7/2016 |
| KR | 102279278 | | 7/2021 |
| TW | 202318385 | A | 5/2023 |
| TW | 202404343 | A | 1/2024 |
| WO | 2000045605 | | 8/2000 |
| WO | 20090152526 | | 12/2009 |
| WO | 2015188595 | A1 | 12/2015 |
| WO | 2020156309 | | 8/2020 |
| WO | 2020192051 | A1 | 10/2020 |
| WO | 2020215878 | | 10/2020 |
| WO | 2021118556 | | 6/2021 |
| WO | 2022046025 | | 3/2022 |
| WO | 2022105484 | | 5/2022 |
| WO | 2022132370 | | 6/2022 |
| WO | 2022232996 | | 11/2022 |

OTHER PUBLICATIONS

"International Preliminary Report on Patentability", Application No. PCT/US2019/065677, May 17, 2022, 18 pages.
"International Search Report and Written Opinion", Application No. PCT/US2022/072042, Nov. 22, 2022, 15 pages.
"International Search Report and Written Opinion", Application No. PCT/US2019/065677, May 26, 2020, 25 pages.
"White point—Wikipedia", Retrieved at: https://en.wikipedia.org/wiki/White_point—on Feb. 7, 2023, 2 pages.

(56) References Cited

OTHER PUBLICATIONS

Agahian, et al., "Clustering-Based Display Calibration", Technical Disclosure Commons, https://www.tdcommons.org/dpubs_series/5611, Jan. 2, 2023, 7 pages.
Choi, "Clock Trace Structure for Block Sequential Clock Driving", Technical Disclosure Commons, https://www.tdcommons.org/dpubs_series/4786, Dec. 19, 2021, 11 pages.
Choi, et al., "Disabling Transitions When Encoded Intensity is Low", Application No. PCT/US2021/070522, filed May 10, 2021, 46 pages.
Choi, et al., "Dynamically Altering Clock Signal Frequencies in LTPO AMOLED Displays", Technical Disclosure Commons, https://www.tdcommons.org/dpubs_series/4652, Oct. 12, 2021, 11 pages.
Choi, et al., "Expediting Fingerprint Authentication by Compensating for Display Luminance Latency", Technical Disclosure Commons, https://www.tdcommons.org/dpubs_series/4686, Oct. 29, 2021, 11 pages.
Choi, et al., "Readability Enhancements for Device Displays used in BrightReadability Enhancements for Device Displays used in BrightLighting Conditions", Technical Disclosure Commons—https://www.tdcommons.org/dpubs_series/3871, Dec. 10, 2020, 9 pages.
Colantoni, et al., "High-End Colorimetric Display Characterization Using an Adaptive Training Set", Society for Information Display, Aug. 2011, 11 pages.
Dianat, et al., "Dynamic Optimization Algorithm for Generating Inverse Printer Map with Reduced Measurements", Published in the proceedings of IEEE Int. Conference on Acoustics, Speech, and Signal Processing, May 2006, 5 pages.
Eiriksson, et al., "Predicting Color Output of Additive Manufactured Parts", Proceedings of Achieving Precision Tolerances in Additive Manufacturing: ASPE Spring Topical Meeting, Jan. 1, 2015, 6 pages.
Hohmann, et al., "Performance Optimization for In-Vehicle Desplays", Jul. 2018, 5 pages.
Hung, "Colorimetric Calibration in Electronic Imaging Devices using a look-up-table Model and Interpolations", Jan. 1993, Need Copy.
Karri, et al., "User Interface Mitigation of Display Artifacts During Transitions between Display Clock Speeds", Technical Disclosure Commons, https://www.tdcommons.org/dpubs_series/5427, Nov. 4, 2022, 7 pages.
Kim, et al., "Adaptive Display Frequency Control for Power Savings", Technical Disclosure Commons, https://www.tdcommons.org/dpubs_series/5476, Nov. 4, 2022, 12 pages.
Mestha, et al., "Control of Color Imaging Systems: Analysis and Design", Chapter 6.5; Compression of Lookup Tables, 2009, 14 pages.
Morgan, "Google Pixel 6 Pro review", Oct. 26, 2021, 22 pages.
Poynton, et al., "Innovations in 3-D Colour LUTs for Display Calibration", https://kb.portrait.com/help/innovations-in-3d-colour-lut-s-for-display-calibration, Jan. 2014, 9 pages.
Poynton, et al., "Innovations in 3D Colour LUT's for Display Calibration", https://kb.portrait.com/help/innovations-in-3d-colour-lut-s-for-display-calibration accessed Aug. 29, 2019, Apr. 2, 2019, 13 pages.
Shin, et al., "Dynamic Voltage Scaling of OLED Displays", Jun. 2011, 6 pages.
Wen, et al., "Improving Under-Display Fingerprint Authentication Latency by Normalizing Frame Luminance", Technical Disclosure Commons—https://www.tdcommons.org/dpubs_series/5006, Mar. 24, 2022, 12 pages.
Yang, "Determining an Optimal Display Module-Level White Point Target for a Display Module", Technical Disclosure Commons—https://www.tdcommons.org/dpubs_series/5718, Mar. 7, 2023, 12 pages.
Yonebayashi, et al., "High refresh rate and low power consumption AMOLED panel using top-gate n-oxide and p-LTPS TFTs", Mar. 2020, 10 pages.
Youn, et al., "Image Data Compensation to Prevent Display Artifacts on an OLED Display", Technical Disclosure Commons, https://www.tdcommons.org/dpubs_series/4615, Sep. 23, 2021, 8 pages.
"LG Introduces New Foldable Display Tech That's Hard as Glass, Has no Creases", https://www.gsmarena.com/lg_introduces_new_foldable_display_material_with_no_creases_hard_as_glass-news-50837.php, Sep. 7, 2021, 1 page.
Hou, et al., "Foldable Display Stack-Up Structures with a Divided Thin Glass Layer", Technical Disclosure Commons—https://www.tdcommons.org/dpubs_series/6406, Nov. 8, 2023, 10 pages.
Hsu, Tai-Yuan, "Histogram-Based Local Tone Mapping Algorithm for a Data Processing Unit", Technical Disclosure Commons, https://www.tdcommons.org/dpubs_series/6151, Aug. 18, 2023, 9 pages.
Matei, Mihai, "Samsung's Ultra-Thin Glass is no Good for Large Foldable Tablets or Laptops", https://www.sammobile.com/news/samsung-ultra-thin-glass-no-good-for-large-foldable-tablets-laptops/, Aug. 29, 2022, 5 pages.
Ou, Yafei, "Real-time Tone Mapping: A Survey and Cross-Implementation Hardware Benchmark", May 22, 2022, 21 pages.
Thai, et al., "HDR Image Tone Mapping Histogram Adjustment with Using An Optimized Contrast Parameter", Jan. 5, 2020, 7 pages.
Zhao, et al., "Learning Tone Curves for Local Image Enhancement", May 30, 2022, 15 pagss.
Antonio-Torres, et al., "LUT-based compensation model for OLED degradation", May 2005, pp. 435-441.
Kim, et al., "Pixel Burn-In Compensation Parameter Compression for Organic Light Emitting Diode Displays", Technical Disclosure Commons, https://www.tdcommons.org/dpubs_series/5871, May 8, 2023, 12 pages.
"DAC < Basic D/A Converter Configurations > ", ROHM—retrieved at: https://www.rohm.com/electronics-basics/ad-da-converters/da-converter-configurations—on Jun. 6, 2024, 9 pages.
"What is the Solution for Elements Blurring and Moving During Animations in Webflow?", Retrieved at: https://www.flowradar.com/answer/solution-elements-blurring-moving-during-animations-webflow—on Apr. 30, 2024, 3 pages.
Choi, et al., "Independently Controllable Black Level Voltage in Digital-to-Analog Converter Circuits for AMOLED Driving Circuits", Technical Disclosure Commons, https://www.tdcommons.org/dpubs_series/7114, Jun. 18, 2024, 13 pages.
Choi, et al., "Smart Auto Frame Insertion for Low Power Consumption in AMOLED Displays AMOLED Displays", Technical Disclosure Commons, https://www.tdcommons.org/dpubs_series/7113, Jun. 18, 2024, 12 pages.
Lee, et al., "Illumination-Level Adaptive Color Reproduction Method with Lightness Adaptation and Flare Compensation for Mobile Display", Jan. 2007, 9 pages.
Lee, et al., "White LED Backlight Control for Motion Blur Reduction and Power Minimization in Large LCD TVs", Jun. 2012, 18 pages.
Li, et al., "Advanced Metrology for Display Uniformity Performance Judgement", Technical Disclosure Commons, https://www.tdcommons.org/dpubs_series/7119, Jun. 21, 2024, 10 pages.
Li, et al., "Advanced Prediction Model for Variable Refresh Rate Compensation Compensation", May 29, 2024, 9 pages.
Li, et al., "Smart Mathematical Model for Variable Refresh Rate Prediction Algorithm", Technical Disclosure Commons, https://www.tdcommons.org/dpubs_series/7047, May 29, 2024, 10 pages.
"International Preliminary Report on Patentability", Application No. PCT/US2022/072042, Oct. 29, 2024, 11 pages.
Bai, et al., "On-Pixel Ratio-Based Adjustment of Local High Brightness Control", Oct. 8, 2024, 13 pages.
"International Preliminary Report on Patentability", Application No. PCT/US2020/047670, Feb. 28, 2023, 10 pages.
"International Search Report and Written Opinion", Application No. PCT/US2021/059750, Feb. 25, 2022, 11 pages.
"International Search Report and Written Opinion", Application No. PCT/US2020/047670, May 12, 2021, 13 pages.
"Non-Final Office Action", U.S. Appl. No. 17/507,293, Feb. 17, 2023, 7 pages.
"Notice of Allowance", U.S. Appl. No. 17/139,465, May 18, 2022, 9 pages.

(56) References Cited

OTHER PUBLICATIONS

"Notice of Allowance", U.S. Appl. No. 17/507,293, Jun. 28, 2023, 7 pages.
"Samsung Galaxy Z Flip: Top Features", Accessed online at: https://www.themobileindian.com/picture-story/samsung-galaxy-z-flip-top-features-1309-14229 on Oct. 20, 2020, Feb. 15, 2020, 6 pages.
Choi, Sangmoo, "Deposition of Black Material on Metal Traces Surrounding Display Screen Blind-Holes to Increase Camera Performance and Improve Ae", Technical Disclosure Commons—https://www.tdcommons.org/dpubs_series/4321, May 25, 2021, 10 pages.
Choi, et al., "Light-Guiding Structure For Under-Display Sensor Modules", Technical Disclosure Commons; https://www.tdcommons.org/dpubs_series/3527, Aug. 17, 2020, 8 pages.
Iorga, Radu, "Huawei Mate X2 5G Gets Rendered And Looks a Lot Like the Galaxy Z Fold 2 5G", Accessed online at: https://tablet-news.com/huawei-mate-x2-5g-gets-rendered-and-looks-a-lot-like-the-galaxy-z-fold-2-5g/ on Oct. 20, 2020, Oct. 13, 2020, 3 pages.
Li-Fong, et al., "A Circular Flexible Amoled Display with a 1-mm Slim Border", May 25, 2016, pp. 847-850.
Lih, et al., "A True Circular 1.39 Inch Amoled for Wearable Application", May 2016, pp. 566-569.
Lin, et al., "Preventing Dust Ingression into a Foldable Mobile Device", Technical Disclosure Commons, https://www.tdcommons.org/dpubs_series/7587, Nov. 22, 2024, 8 pages.
Lombardi, et al., "Adaptive User Interface for a Camera Aperture within an Active Display Area", Technical Disclosure Commons; Retrieved from https://www.tdcommons.org/dpubs_series/2719, Nov. 25, 2019, 12 pages.
Skanda, Sai, "Xiaomi Mi 9 to Feature an Improved In-screen Fingerprint Sensor", https://www.gizchina.com/2019/02/17/mi-9-fingerprint-improved-fingerprint/, Feb. 17, 2019, 10 pages.
Subramaniam, Vaidyanathan, "LG Patents a True Bezel-Less Smartphone Display with an In-Display Selfie Camera", Accessed online at: https://www.notebookcheck.net/LG-patents-a-true-bezel-less-smartphone-display-with-an-in-display-selfie-camera.357626.0.html on Oct. 20, 2020, Nov. 7, 2018, 4 pages.
Wakser, et al., "Form-in-Place Adhesive Gasket to Waterproof an Electronic Device", Technical Disclosure Commons; Retrieved from https://www.tdcommons.org/dpubs_series/3239, May 18, 2020, 7 pages.
"Non-Final Office Action", U.S. Appl. No. 18/884,496, May 5, 2025, 8 pages.
Mienko, et al., ""Ultra-dark" OLED Panel Combining Polarization and Masking Layers", Technical Disclosure Commons, https://www.tdcommons.org/dpubs_series/7923, Mar. 18, 2025, 12 pages.

* cited by examiner 900-1

900-2

COMPENSATING FOR NON-UNIFORM LUMINANCE IN CURVED-EDGE DISPLAYS

RELATED APPLICATION(S)

This application is a continuation of International Application No. PCT/US2022/072042, filed May 2, 2022, the disclosure of which is incorporated herein by reference in its entirety.

BACKGROUND

Computing devices continue to play significant roles in the daily lives of users as communicators, planners, notebooks, contact books, entertainment devices, and so forth. To facilitate being used as such, computing devices may include various components for user input and device output. For example, to facilitate being used as a communicator, a computing device may include a speaker and a microphone. As another example, to facilitate being used as an entertainment device, in addition to a speaker, a computing device may include a display. In fact, because they enable intuitive and efficient ways by which to interact with computing devices, displays have become one of the most widely used components in computing devices for user input and device output.

Larger displays are often desirable by users for their more-immersive viewing experience and extra real estate for efficient and intuitive user input and device output. However, a larger display requires a larger enclosure in which to house the display, which may make the computing device cumbersome for users to hold and use. Manufacturers of computing devices having displays, therefore, have spent considerable effort to increase the screen-to-body ratio of these devices. The screen-to-body ratio of a computing device simply describes how much of the user-facing side of the computing device is taken up by the display versus how much of the user-facing side is taken up by something besides the display, like a bezel or an array of biometric sensors. By maximizing the screen-to-body ratio, manufacturers of computing devices having displays may offer users the best of two worlds: a large display and a relatively small device. One technique a manufacturer may employ is to curve the edges of the display to increase the screen-to-body ratio of the computing device. Generally, displays having a curved edge use a flexible display-panel technology, such as an organic light-emitting diode (OLED) display-panel technology.

Beyond helping enable a curvature of a display, OLED display panels provide dynamic refresh rates, power efficiency, vibrant colors, and deep blacks. However, the vibrant colors may be enjoyed less by a user who views the display at a sharp angle. Like many display-panel technologies, OLED displays, when viewed at a sharp angle, appear dimmer to the user. Unfortunately, this means that when a computing device manufacturer curves the edges of the display to achieve a higher screen-to-body ratio, the user views the curved edges of the display at a sub-optimal viewing angle. The resulting luminance, where content at a center of the display appears bright and content at the curved edges of the display appears dim, is non-uniform and compromises user experience.

SUMMARY

This document describes systems and techniques directed at compensating for non-uniform luminance in curved-edge displays. In aspects, a computing device having a curved-edge, organic light-emitting diode (OLED) display and a luminance manager is configured to receive an indication of a luminance that is, or is intended to be, displayed by pixels of the curved-edge display. Responsive to and based on the received indication of the luminance, the luminance manager determines a luminance modification for the pixels of the curved-edge OLED display. Based on the determined luminance modification, the luminance manager modifies the luminance that is displayed or modifies the intended luminance that is intended to be displayed by the curved-edge OLED display effective to compensate for the non-uniform luminance.

In some aspects, a method is disclosed for compensating for non-uniform luminance in curved-edge displays. The method includes receiving an indication of a luminance that is intended to be displayed by pixels of a curved-edge organic light-emitting diode (OLED) display. In an example, a curved-edge OLED display may be enclosed in the housing of a smartphone. The method also includes receiving a non-uniform luminance characteristic associated with the curved-edge OLED display. Further, the method includes determining, based on the received indication of the luminance and the non-uniform luminance characteristic associated with the curved-edge OLED display, a luminance modification for one or more of the pixels of the curved-edge OLED display. In addition, the method includes causing the luminance modification by one or more of the pixels of the curved-edge OLED display, the causing modifying the luminance that is intended to be displayed effective to compensate for the non-uniform luminance characteristic associated with the curved-edge OLED display.

In further aspects, a computing device is disclosed. The computing device includes a curved-edge OLED display, one or more processors, and memory. The memory stores instructions that, when executed by the one or more processors, cause the one or more processors to implement a luminance manager effective to compensate for non-uniform luminance in curved-edge display applications by performing the method above.

The details of one or more implementations are set forth in the accompanying Drawings and the following Detailed Description. Other features and advantages will be apparent from the Detailed Description, the Drawings, and the Claims. This Summary is provided to introduce subject matter that is further described in the Detailed Description. Accordingly, a reader should not consider the Summary to describe essential features nor threshold the scope of the claimed subject matter.

BRIEF DESCRIPTION OF DRAWINGS

The details of one or more aspects of compensating for non-uniform luminance in curved-edge displays are described in this document with reference to the following Drawings, in which the use of same numbers in different instances may indicate similar features or components.

DETAILED DESCRIPTION

Overview

Figure 1:
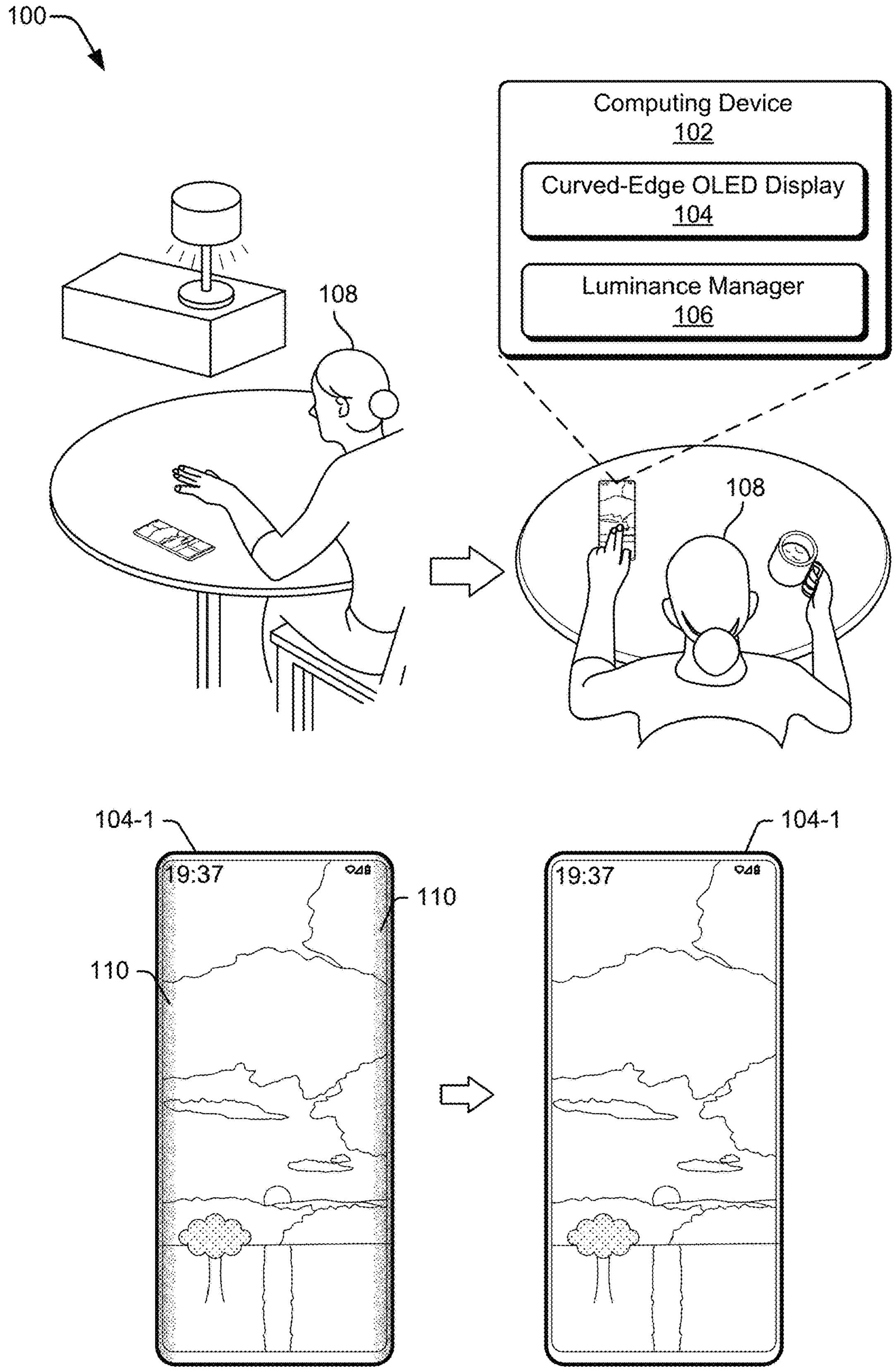
FIG. 1 illustrates an example implementation of an example computing device having a curved-edge OLED display and a luminance manager configured to compensate for non-uniform luminance in curved-edge displays.

Many computing devices (e.g., smartphones, tablets, televisions) include an electronic visual display, often referred to as a display or a screen, integrated as a portion of the housing of the computing device. While various display technologies have been used, many of these older technologies are being replaced by organic light-emitting diode (OLED) display technologies. This is due in part to the vibrant colors and deep blacks of OLED displays.

In addition to vibrant colors and deep blacks, OLED display technology offers other benefits as well. For example, OLED displays do not require a backlight like LCDs (liquid crystal displays), so OLED displays may be manufactured to be thinner than LCD displays, enabling computing device manufacturers to construct thinner and lighter devices. Further, OLED displays power each pixel individually and can turn a pixel completely off, which may be more power-efficient than LCDs, enabling a lower thermal overhead or a longer battery life in mobile computing device applications. As another example, as opposed to LCD displays, OLED displays are more flexible, easing the manufacture of computing devices having folding or curved displays.

There are many reasons a computing device manufacturer may wish to fold or curve a display more easily by utilizing OLED display technology. A foldable display integrated on the inside of a folding housing of a computing device, for example, enables a manufacturer to construct a computing device with a large screen while maintaining a relatively small form factor by folding in on itself. In some aspects, a manufacturer of a computing device having a large format display (e.g., television) may wish to curve the display towards the user to preserve a uniform luminance and color accuracy through perpendicular viewing angles anywhere on the large format display. As another example, a manufacturer of a mobile computing device (e.g., a smartphone) may wish to curve the edges of the display away from the user, such as to hide the bezels behind the display, to enable a higher screen-to-body ratio. However, by curving the edges of the display away from the user, and in contrast to displays curved toward a user, the user may view the curved edges of the display at a sub-optimal viewing angle, sacrificing a uniform luminance and color accuracy across the display.

As a specific example, a user of a computing device having a curved-edge OLED display may receive a message from a friend containing an image of a sunset. On viewing the image, the user may misinterpret the colors and luminance at the curved edges of the display, leading to a misunderstanding between the friend, who captured the image of the sunset, and the user of the curved-edge display computing device. The non-uniform luminance across the display may also lead the user of the curved-edge display computing device to misinterpret the gradient of the sunset.

As an additional example, a user of a computing device having a curved-edge display may wish to enjoy a video on the computing device in landscape orientation. If the user maximizes the video to fill the curved-edge display, the non-uniform luminance may make the video appear to have a higher aspect ratio. Due to this apparent higher aspect ratio caused by the non-uniform luminance across the display (e.g., a line along the X axis), the user may miss information contained in the video at the curved edges of the display, compromising user experience.

Misinterpreting the gradient of a beautiful sunset, misunderstanding a friend, and missing important information in a video are just three examples of how a non-uniform luminance in a curved-edge display application leads to a poor user experience. This document describes systems and techniques directed at compensating for non-uniform luminance in curved-edge displays.

The following discussion describes operating environments, techniques that may be employed in the operating environments, and example methods. Although systems and techniques for compensating for non-uniform luminance in curved-edge displays are described, it is to be understood that the appended claims are not necessarily limited to the specific features or methods described. Rather, the specific features and methods are disclosed as example implementations and reference is made to the operating environment by way of example only.

Example Device

FIG. 1 illustrates an example implementation 100 of an example computing device 102 having a curved-edge OLED display 104 and a luminance manager 106 configured to compensate for non-uniform luminance in curved-edge displays. In one example, as illustrated in FIG. 1, a user 108 receives a multimedia message on her smartphone (e.g., computing device 102) from a friend containing an image. She wishes to view the image, so she unlocks her smartphone and opens the multimedia message from the friend. Upon opening the multimedia message, the user 108 sees that the friend sent an image of a vibrant, colorful sunset, shown on a curved-edge OLED display 104-1.

In response to the user 108 opening the multimedia message containing the image of the vibrant, colorful sunset from her friend, the luminance manager 106 receives an indication of a luminance that is intended to be displayed by pixels of the curved-edge OLED display 104-1. The received indication of luminance may be an output of a display driver integrated circuit (DDIC) to the curved-edge OLED display 104-1. The output of the DDIC may be a digital gray level (e.g., gray 120 (G120), G255), a voltage level (e.g., 5 volts (V), 10 V), or a time-modulated signal (e.g., a 60 hertz (Hz) square wave, a 120 Hz square wave) directing pixels of the curved-edge OLED display 104-1 to emit a specific luminance and color at a pre-determined frequency. Also, in response to the user 108 opening the multimedia message, the luminance manager 106 receives a luminance characteristic that is associated with the curved-edge display. The received luminance characteristic represents a characteristic of the display where luminance, from one viewing perspective, is non-uniform. This can, in many cases, be corrected by the techniques disclosed herein through modification of the luminance emitted, such as by increasing luminance emitted at the curved edges of the display. A modification is determined using various manners, including, but not limited to, empirically developed and machine-learned manners. For example, a manufacturer of curved-edge OLED displays may use an on-axis sensor (e.g., a camera) to measure a luminance of many (e.g., hundreds, thousands, millions) curved-edge OLED displays at various luminance settings and digital gray levels to develop a compensation map based on the non-uniform luminance data that correlates a luminance as it is likely to be perceived with an intended luminance. Stated another way, a compensation map may be generated based on the indication of the luminance and the non-uniform luminance characteristic associated with the curved-edge display. The compensation map may be stored on the memory of the smartphone as a lookup table or other computer-usable format.

Based on the received indication of luminance and the received non-uniform luminance characteristic at which the luminance is likely to be perceived from a viewing perspective, the luminance manager 106 determines a luminance modification for the pixels of the curved-edge OLED display 104-1. The luminance manager 106 may determine a luminance modification for the pixels of the curved-edge OLED display 104-1 using various manners, such as based on a compensation map that correlates a luminance modification with a user-perceived luminance and an indication of luminance (e.g., developed by a manufacturer of curved-edge OLED displays mentioned earlier). The compensation map may be stored on the memory of the smartphone as a lookup table or other computer-usable format. The luminance manager 106 may reference the lookup table to determine a luminance modification for the pixels of the curved-edge OLED display 104-1 to compensate for the non-uniform luminance shown. In this example, the luminance manager 106 determines a luminance increase for the pixels of the curved portions 110 of the display and causes the pixels of the curved portions 110 to increase in luminance, resulting in the improved image of the sunset shown in the curved-edge OLED display 104-2.

Figure 2:
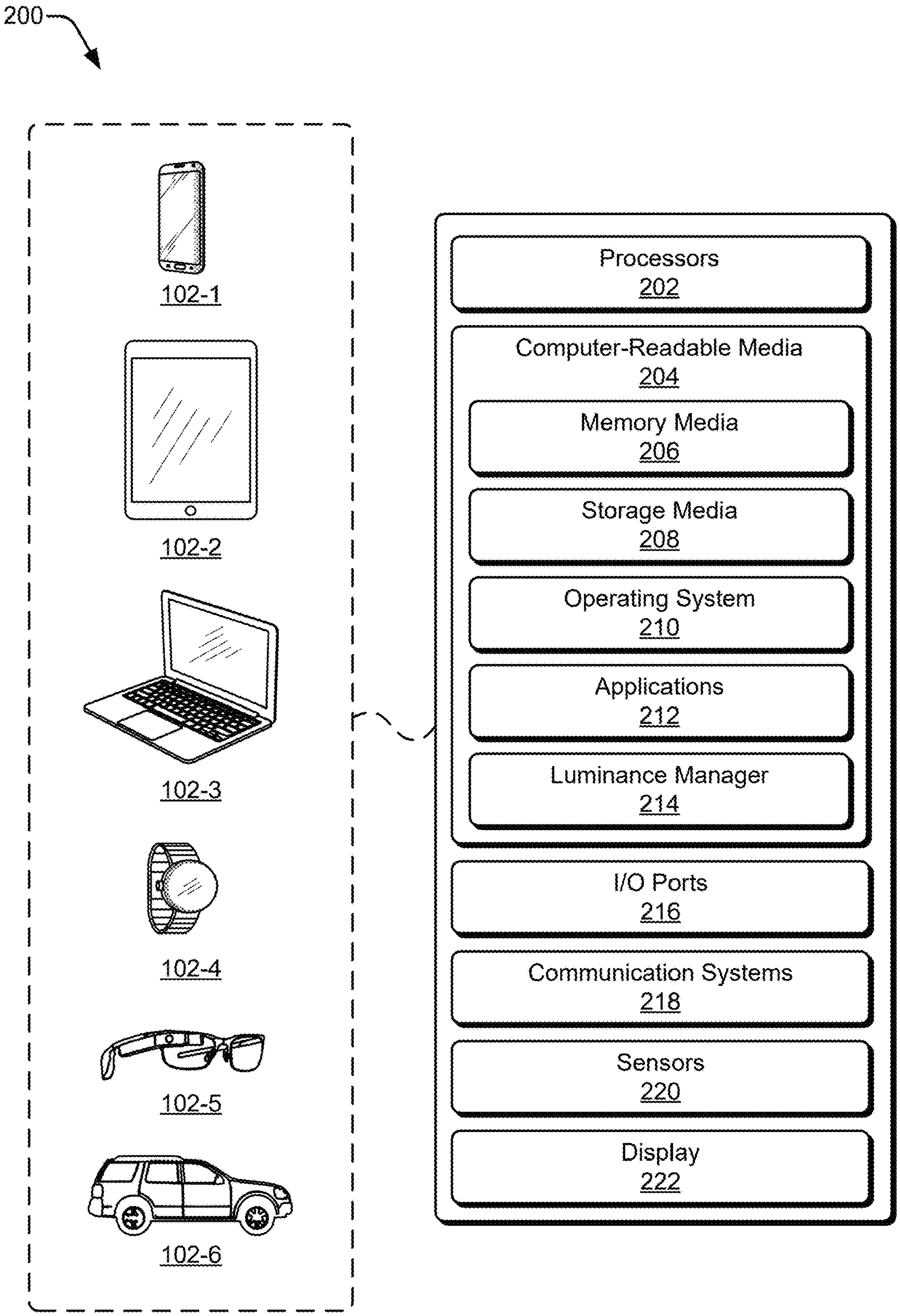
FIG. 2 illustrates an example implementation of the example computing device from FIG. 1, which is configured to compensate for non-uniform luminance in curved-edge displays.

Consider FIG. 2, which illustrates in more detail, an example implementation 200 of the example computing device 102 from FIG. 1, which is configured to compensate for non-uniform luminance in curved-edge displays. The computing device 102 is illustrated with a variety of example devices, including consumer electronic devices. As non-limiting examples, the computing device 102 can be a smartphone 102-1, a tablet 102-2, a laptop computer 102-3, a smartwatch 102-4, a pair of smart glasses 102-5, and an automotive vehicle 102-6. Although not shown, the computing device 102 may also be implemented as an audio recording device, a health monitoring device, a home automation system, a home security system, a gaming console, a personal media device, a personal assistant device, a drone, a home appliance, and the like. Note that the computing device 102 can be wearable, non-wearable but mobile, or relatively immobile (e.g., desktop computers, home appliances). Note also that the computing device 102 can be used with, or embedded within, many computing devices 102 or peripherals, such as in automotive vehicles or as an attachment to a personal computer. The computing device 102 may include additional components and interfaces omitted from FIG. 2 for the sake of clarity.

As illustrated, the computing device 102 includes one or more processors 202 and computer-readable media 204 (CRM 204). The processors 202 may include one or more of any appropriate single-core or multi-core processor (e.g., a graphics processing unit (GPU), a central processing unit (CPU)). The CRM 204 includes memory media 206 and storage media 208. The operating system 210 (OS 210), applications 212, and luminance manager 214 implemented as computer-readable instructions on the CRM 204 can be executed by the processors 202 to provide some or all the functionalities described herein. For example, the processors 202 may perform specific computational tasks of the operating system directed at controlling the color and luminance of on-screen content on a display. The CRM 204 may include one or more non-transitory storage devices such as random-access memory, a solid-state drive, a magnetic spinning drive, or any type of storage media suitable for storing electronic instructions, each coupled with a data bus. The term “coupled” may refer to two or more elements that are in direct contact (physically, electrically, magnetically, optically, etc.) or two or more elements that are not in direct contact with each other, but still cooperate and/or interact with each other.

In additional aspects, various implementations of the luminance manager 214 can include one or more integrated circuits, a system on a chip, a secure key store, hardware embedded with firmware stored on read-only memory, a printed circuit board with various hardware components, or any combination thereof. As described herein, a non-uniform luminance compensation system may include one or more components of the computing device 102, as illustrated in FIG. 1, configured to perform non-uniform luminance compensation. In additional implementations, the non-uniform luminance compensation system may be implemented as the computing device 102.

The computing device 102 may also include input/output (I/O) ports 216 and communication systems 218. The I/O ports 216 enable the computing device 102 to interact with other devices or users through peripheral devices, transmitting any combination of digital signals, analog signals, and radio frequency signals. The I/O ports 216 may include any combination of internal or external ports, such as universal serial bus (USB) ports, audio ports, video ports, dual inline memory module (DIMM) card slots, peripheral component interconnect express (PCIe) slots, and the like. Various peripherals may be operatively coupled with the I/O ports 216, such as human input devices (HIDs), external CRM, speakers, displays, or other peripherals.

The communication systems 218 enable communication of device data, such as received data, transmitted data, or other information as described herein, and may provide connectivity to one or more networks and other devices connected therewith. Example communication systems include near field communication (NEC) transceivers, wireless local area network (WLAN) radios, wireless wide area network (WWAN) radios, infrared transceivers, and wired local area network (LAN) transceivers. Device data communicated over communication systems 218 may be packetized or framed depending on a communication protocol or standard by which the computing device 102 is communicating. The communication systems 218 may include wired interfaces, such as Ethernet or fiber-optic interfaces for communication over a local network, private network, intranet, or the Internet. Alternatively, or additionally, the communication systems 218 may include wireless interfaces that facilitate communication over wireless networks, such as WLANs, WWANs, or cellular networks.

Although not shown, the computing device 102 can also include a system bus, interconnect, or data transfer system that couples with the various components within the computing device 102. A system bus or interconnect can include any one or combination of different bus structures, such as a memory bus, a peripheral bus, a USB, and/or a processor or local bus that utilizes any of a variety of bus architectures.

The computing device 102 may further include, or be connected to, one or more sensors 220 disposed anywhere on or in the computing device 102. In some examples, the sensors 220 may be disposed on or in a peripheral device connected (e.g., wirelessly, wired) to the computing device 102. The sensors 220 can include any of a variety of sensing components, such as an audio sensor (e.g., a microphone), a touch input sensor (e.g., a touchscreen), an image sensor (e.g., a camera, a video camera), an ambient light sensor (e.g., a photodetector), an acceleration sensor (e.g., an accelerometer), and/or a pressure sensor (e.g., barometer). The sensing components can be disposed within a housing of the computing device 102. In implementations, the computing device 102 can include more than one of any one or more of the sensing components.

Further, the computing device 102 includes a display 222 (e.g., curved-edge OLED display 104). Although an OLED display is described herein, it is provided as an example only. The computing device may include or utilize any one of a variety of display technologies, including an active-matrix OLED (AMOLED) display, a vertical alignment (VA) liquid crystal display (LCD), an in-plane switching (IPS) LCD, a twisted nematic (TN) LCD, an electroluminescent display (ELD), and so forth. The display 222 may be flexible, rigid, flat, or curved. The display 222 may be referred to as a screen, such that content (e.g., images, videos) may be displayed on-screen.

Figure 3:
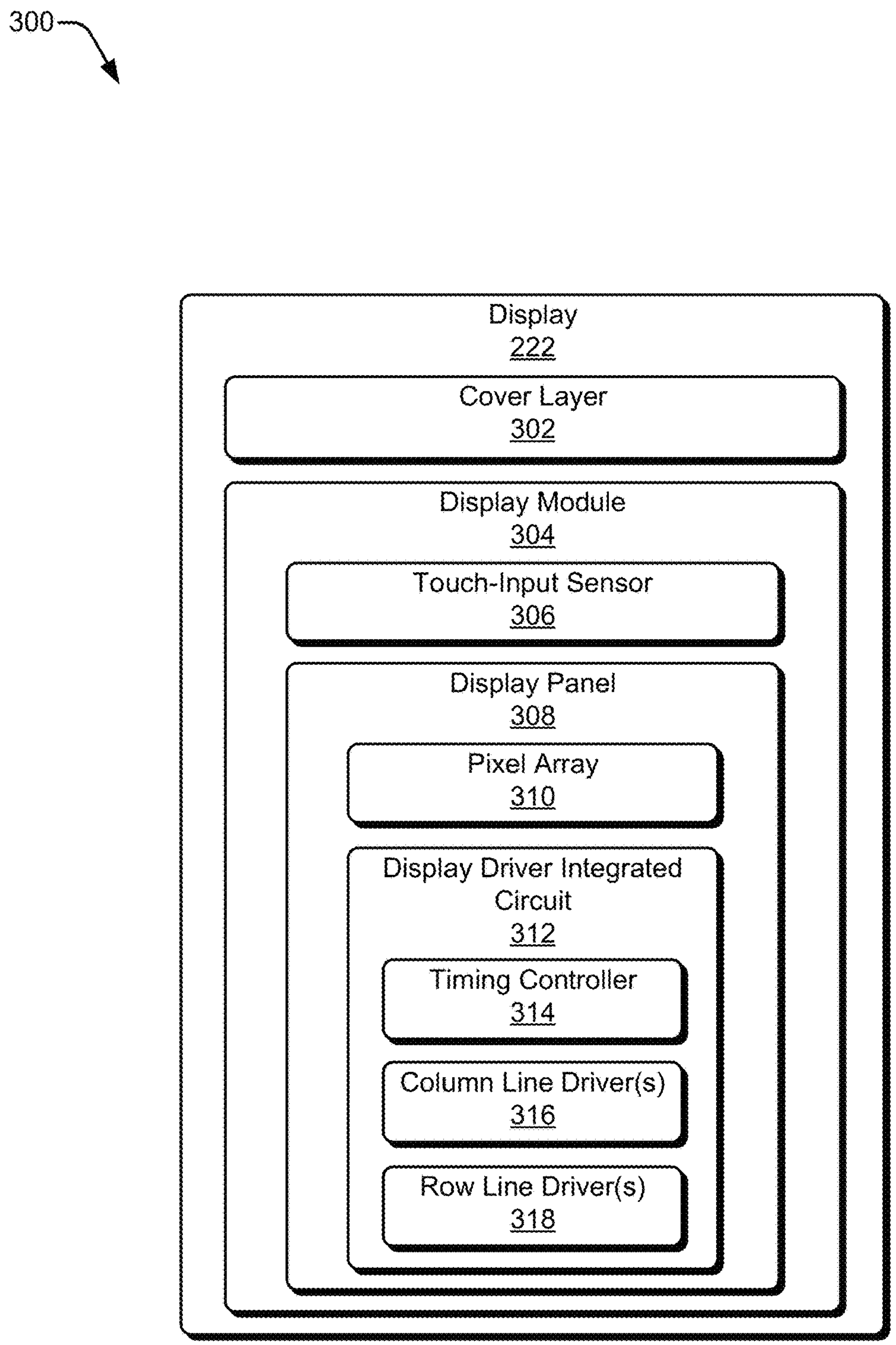
FIG. 3 illustrates an example implementation of the display from FIG. 2 in more detail.

FIG. 3 illustrates an example implementation 300 of the display 222 from FIG. 2 in more detail. Although FIG. 3 shows various entities and components as part of the display 222, any of these entities and components may be separate from, but communicatively coupled to, the display 222.

Shown in FIG. 3, the display 222 includes a cover layer 302 and a display module 304. The cover layer 302 may be composed of any of a variety of transparent materials including polymers (e.g., plastic, acrylic), glass (e.g., tempered glass), and so forth, forming any three-dimensional shape (e.g., polyhedron), such as a rectangular prism or cylinder. The cover layer 302 may have sharp edges (e.g., 2D tempered glass), smooth edges (e.g., 2.5D tempered glass), or curved and smooth edges (e.g., 3D tempered glass), conforming to the shape of the display module 304 disposed beneath the cover layer 302. During manufacturing, a bottom face of the cover layer 302 may be bonded (e.g., glued, laminated) to the display module 304 to protect the display module 304, serving as a barrier to ingress contaminants (e.g., dust, water).

The display module 304 may include a touch-input sensor 306 and a display panel 308. The display panel 308 may include a pixel array 310 of thousands or millions of pixel circuits, forming any two-dimensional grid. Each pixel circuit may include a light-emitting component, such as one or more OLEDs, commonly referred to as a pixel.

The display panel 308 may further include a display driver integrated circuit 312 (DDIC 312). The DDIC 312 may include a timing controller 314 and one or more column line drivers 316. The display panel 308 may further include row line drivers 318. The row line drivers 318 may include gate-line drivers, scan-line drivers, and emission control drivers.

The display-panel stack may further include, often integrated within the display module 304, but sometimes altogether separate from the display module 304, a collimator, one or more polarizer layers (e.g., polarization filters), one or more adhesive layers (e.g., glue), and a protective layer (e.g., an EMBO layer). The protective layer may include one or more layers, such as a polymer layer (e.g., a polyethylene terephthalate (PET) substrate), a metallic layer (e.g., a copper layer, an iron layer), a foam pad, and an adhesive layer. The protective layer may be on the bottom of the display-panel stack (e.g., opposite the cover layer 302), providing protection from, for example, moisture, debris, and radiation (e.g., electromagnetic radiation, heat radiation).

Figure 4:
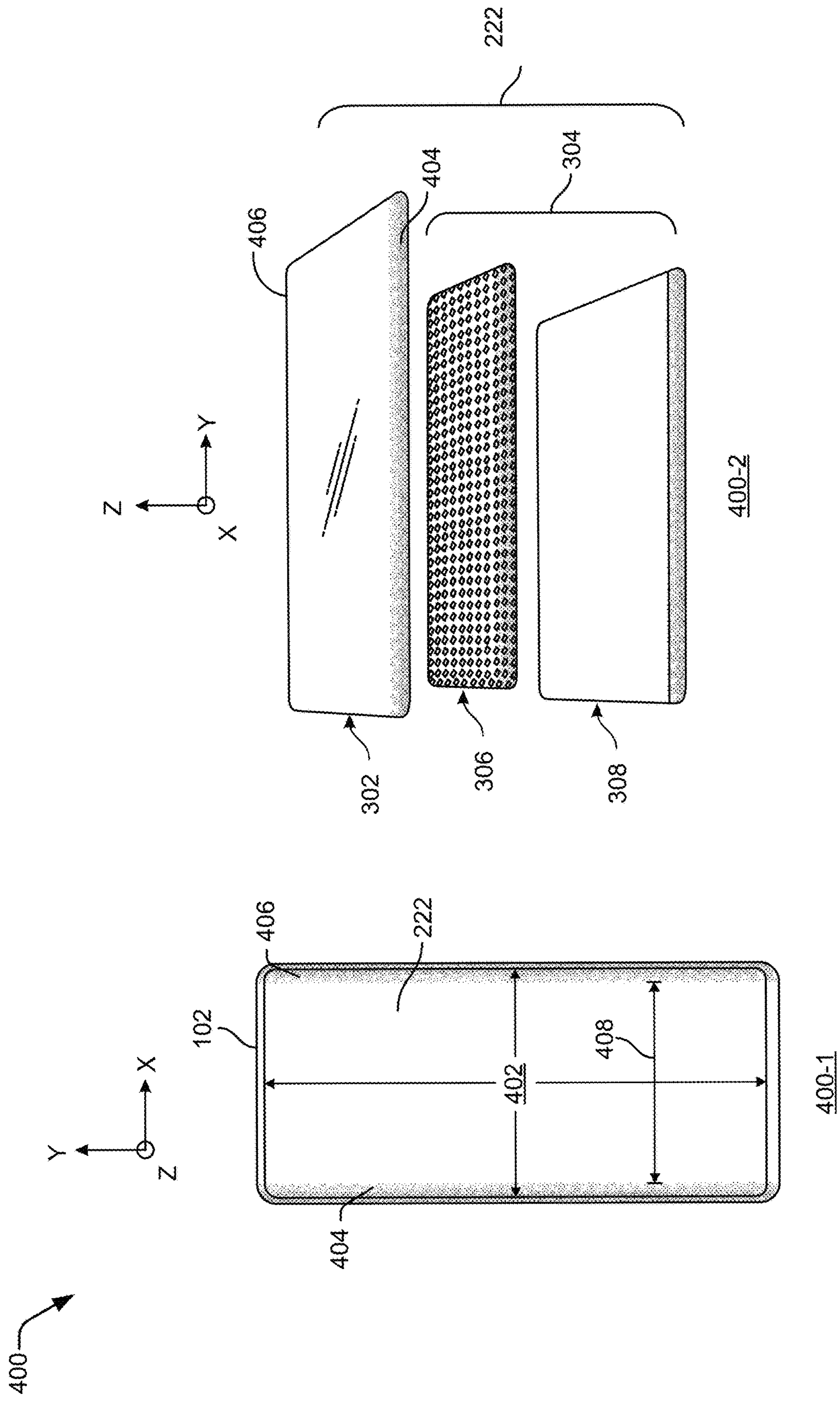
FIG. 4 illustrates an example implementation of the example computing device having the curved-edge display manufactured as a curved-edge display panel stack.

FIG. 4 illustrates an example implementation 400 of the example computing device 102 (e.g., smartphone 102-1) having the display 222 manufactured as a curved-edge display-panel stack. As illustrated in detail view 400-1, the computing device 102 includes at least one layer of the display 222 (e.g., the cover layer 302) integrated as one or more portions of a housing of the computing device 102. The curved-edge display 222 includes an active area 402 that may be visible and accessible to touch by users. The active area 402 is split into three portions: a left curved edge 404, a right curved edge 406, and a flat center portion 408.

Detail view 400-2 illustrates an exploded view of the curved-edge display 222 manufactured as a curved-edge display-panel stack. For clarity in the detail view, some components of the curved-edge display 222 may be omitted. As illustrated, the curved-edge display 222 includes cover layer 302 disposed as a top layer and a display module 304 disposed thereunder. The display module 304 includes the touch-input sensor 306 disposed beneath the cover layer 302 and the display panel 308 disposed beneath the touch-input sensor 306. As shown, the touch-input sensor 306 and the display panel 308 conform to the left curved edge 404 and the right curved edge 406 of the cover layer 302 of the curved-edge display 222.

Figure 5:
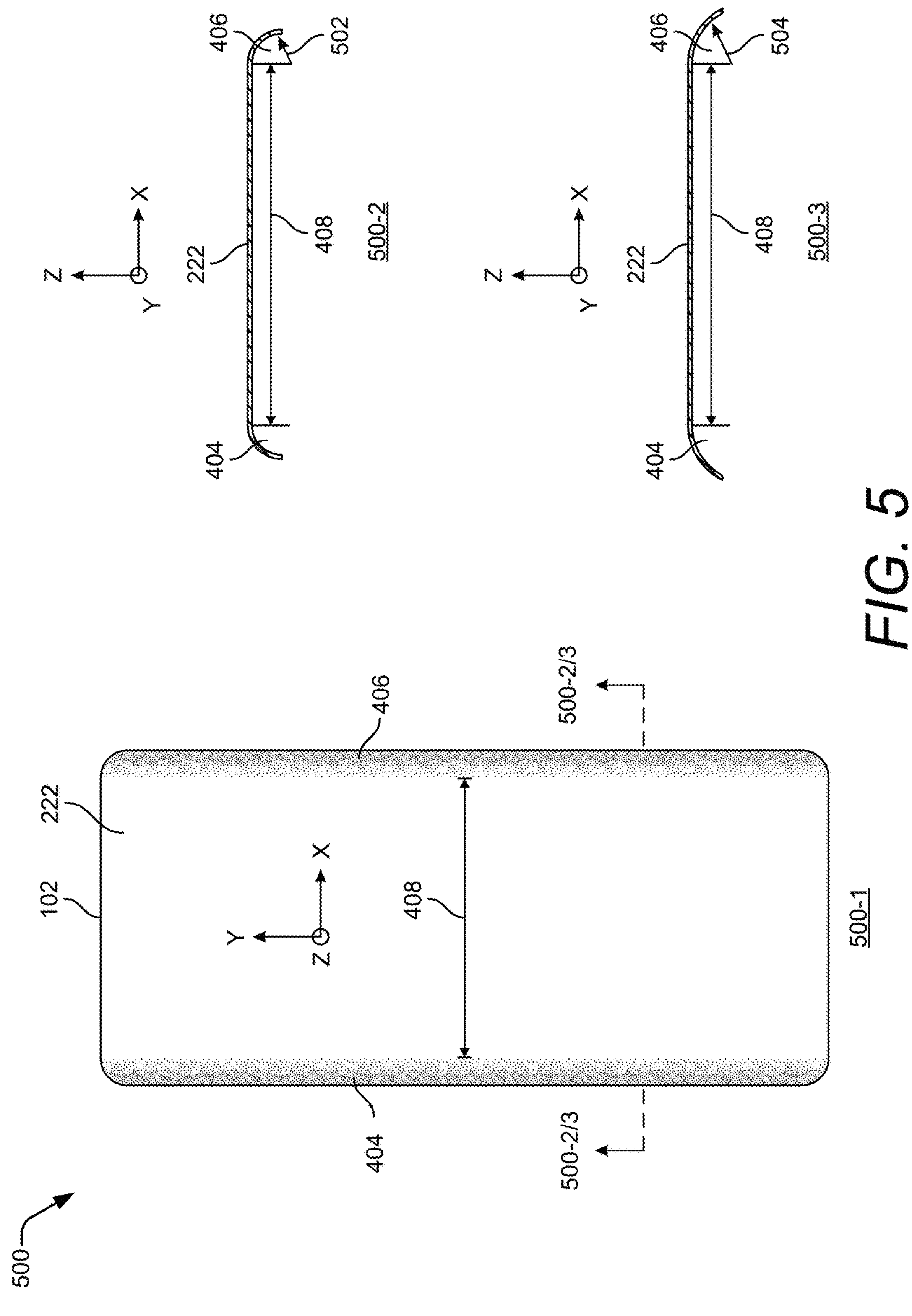
FIG. 5 illustrates an example implementation of the example computing device from FIG. 4 in more detail.

FIG. 5 illustrates an example implementation 500 of the example computing device 102 (e.g., smartphone 102-1) having the curved-edge display 222 manufactured as a curved-edge OLED display. As illustrated in top-down detail view 500-1, the computing device includes at least one layer of the curved-edge OLED display 222 (e.g., the cover layer 302) integrated as one or more portions of the housing of the computing device 102. Detail view 500-1 further illustrates that the active area 402 is split into the three portions mentioned previously: the left curved edge 404, the right curved edge 406, and the flat center portion 408. Detail views 500-2 and 500-3 illustrate cross-sectional views of the computing device 102 having the curved-edge OLED display 222 with the left curved edge 404, the right curved edge 406, and the flat center portion 408. As shown, the left curved edge 404 and the right curved edge 406 have a fixed bending radius. Detail view 500-2 illustrates a smaller fixed bending radius 502. Detail view 500-3 illustrates a larger fixed bending radius 504. Although two fixed bending radii are shown, the fixed bending radius of the curved portions 110 (e.g., left curved edge 404, right curved edge 406) of the curved-edge OLED display 222 may vary, such as by including unfixed curvatures or even roughly straight-line bends relative to the flat center portion 408 (e.g., flat or nearly flat but directed away from the viewing perspective of the user).

Figure 6:
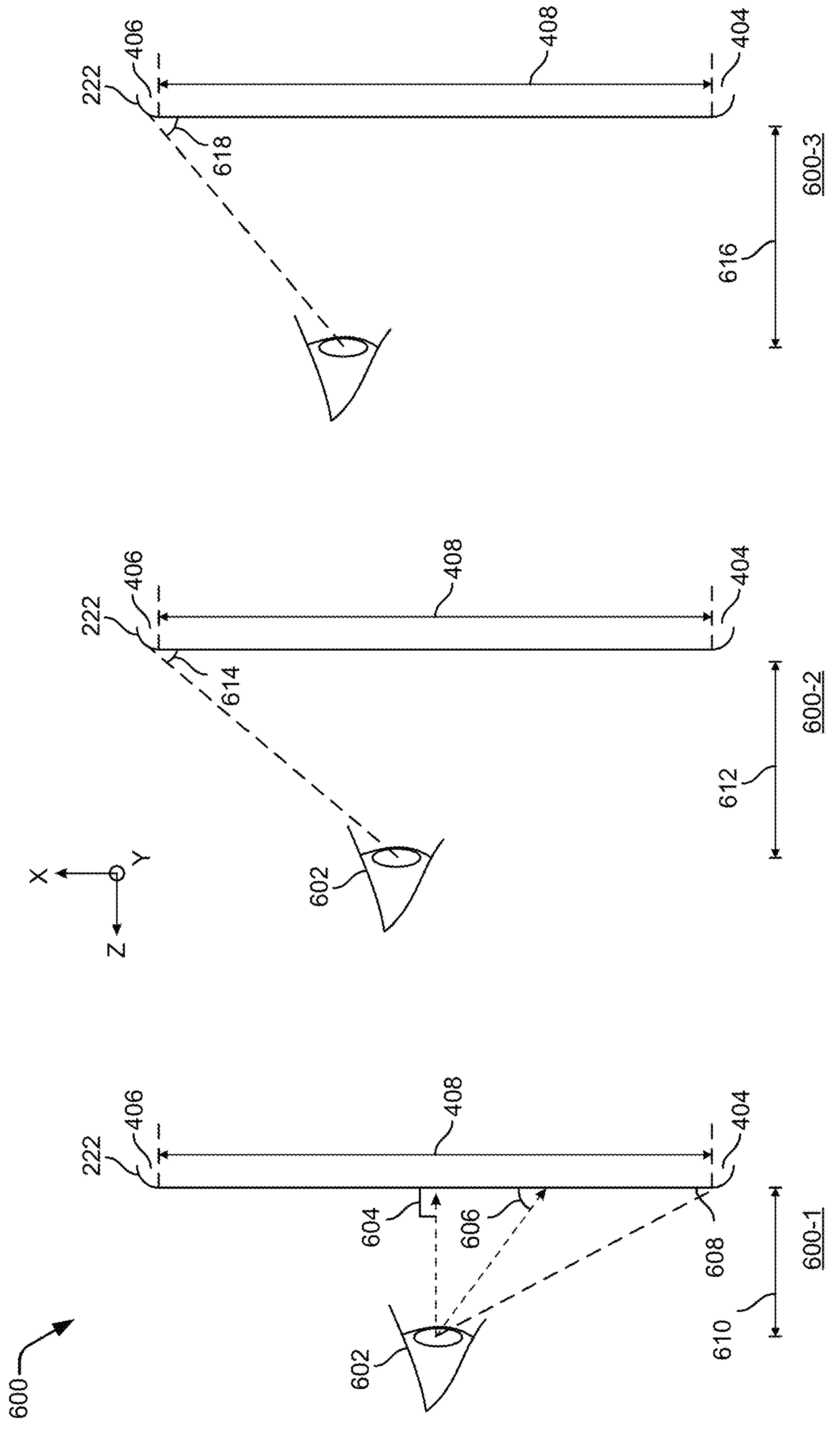
FIG. 6 illustrates another example implementation of the example computing device from FIG. 4 being viewed by a user from various viewing distances and viewing angles.

FIG. 6 illustrates an example implementation 600 of the computing device 102 having the curved-edge OLED display 222 where the cross-sectional views from FIG. 5 are rotated 90 degrees counterclockwise. FIG. 6 further illustrates a user 602, positioned some distance away from the curved-edge OLED display 222, oriented perpendicular to a center of the plane of the flat center portion 408, who may enjoy on-screen content by focusing on various points on the curved-edge OLED display 222. In detail view 600-1, for example, the user 602, positioned at a distance 610 away from the curved-edge OLED display 222, focuses on a point in the center of the flat center portion 408, achieving a perpendicular viewing angle 604 (e.g., 90 degrees). As another example, the user 602 focuses on a point between the center of the flat center portion 408 and the left curved edge 404, achieving a medium viewing angle 606 (e.g., about 70 degrees). As an additional example, the user 602 focuses on a point in the left curved edge 404, achieving a sharp viewing angle 608 (e.g., about 45 degrees). Although not shown, the user 602 may focus on any point of the curved-edge OLED display 222, including points within the left curved edge 404, points anywhere on the flat center portion 408, and points within the right curved edge 406. The viewing angle of the user 602, although not shown, may vary between 90 degrees and nearly 0 degrees, depending on which point of the curved-edge OLED display 222 the user 602 chooses to focus.

Further illustrated by FIG. 6 is a relationship between a viewing angle and a viewing distance. As an example, shown in detail view 600-2, the user 602 focuses on a point in the right curved edge 406 of the curved-edge OLED display 222 at a farther distance 612 (e.g., 12 centimeters (cm)), achieving a less-sharp viewing angle 614 (e.g., 50 degrees). Similarly, as illustrated in detail view 600-3, the user 602 focuses on the same point in the right curved edge 406 at an even farther distance 616 (e.g., 24 cm) from the curved-edge OLED display 222, achieving an even less-sharp viewing angle 618 (e.g., about 55 degrees). While not shown, the user 602 may focus on any point of the curved-edge OLED display 222 at any viewing distance (e.g., closest distance 610, farther (medium) distance 612, and farthest distance 616), generally achieving a sharper viewing angle (e.g., sharper viewing angle 614) at a closer viewing distance (e.g., closest distance 610) and a less sharp viewing angle (e.g., less-sharp viewing angle 618) at a farthest viewing distance (e.g., farthest distance 616).

Figure 7:
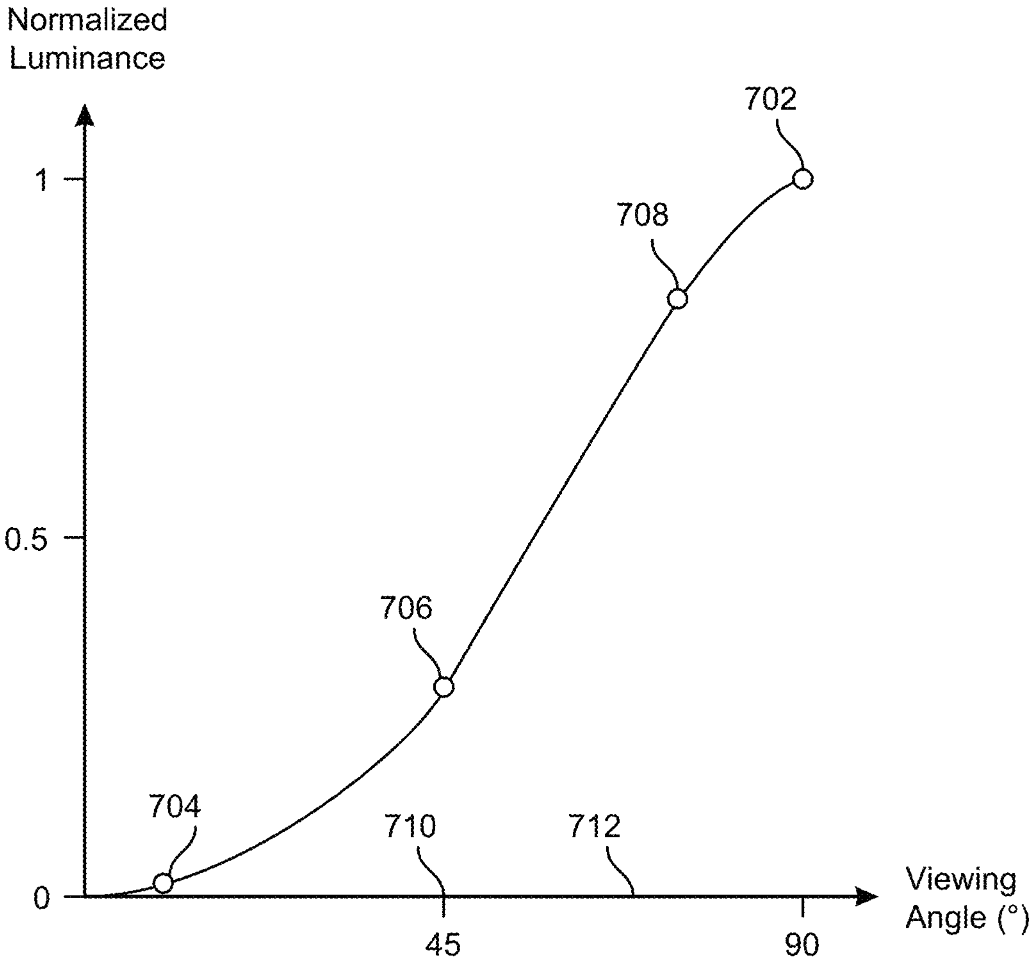
FIG. 7 relates an example normalized luminance to an example viewing angle.

FIG. 7 illustrates a relationship between an example user-perceived normalized luminance and an example viewing angle achieved by a user (e.g., user 602) who views the curved-edge OLED display 222 by focusing on various points on the display from various viewing distances. As shown, a maximum luminance 702 may be observed by the user at a viewing angle of 90 degrees (e.g., perpendicular viewing angle 604). A minimum luminance 704 may be observed by the user at a viewing angle close to zero degrees. A luminance between the maximum luminance 702 and the minimum luminance 704 (e.g., luminance 706, luminance 708) may be observed by the user at viewing angles between 90 degrees and zero degrees (e.g., viewing angle 710, viewing angle 712). A reduced luminance (e.g., minimum luminance 704, luminance 706, luminance 708) less than the maximum luminance 702 can be a function of the light emitted by the curved portions 110 of the curved-edge display panel 308 being refracted in the cover layer 302, the magnitude of refraction depending on the material of the cover layer 302 (e.g., tempered glass, plastic). The reduced luminance (perception of luminance, not actual luminance) is primarily a function of the vector of light emitted by the curved portions 110 of the curved-edge display panel 308, where the user 602, positioned perpendicularly to the center of the plane of the flat center portion 408 of the display, views the vector of light indirectly (e.g., at a viewing angle less than 90 degrees, in this case much less than 90 degrees).

Figure 8:
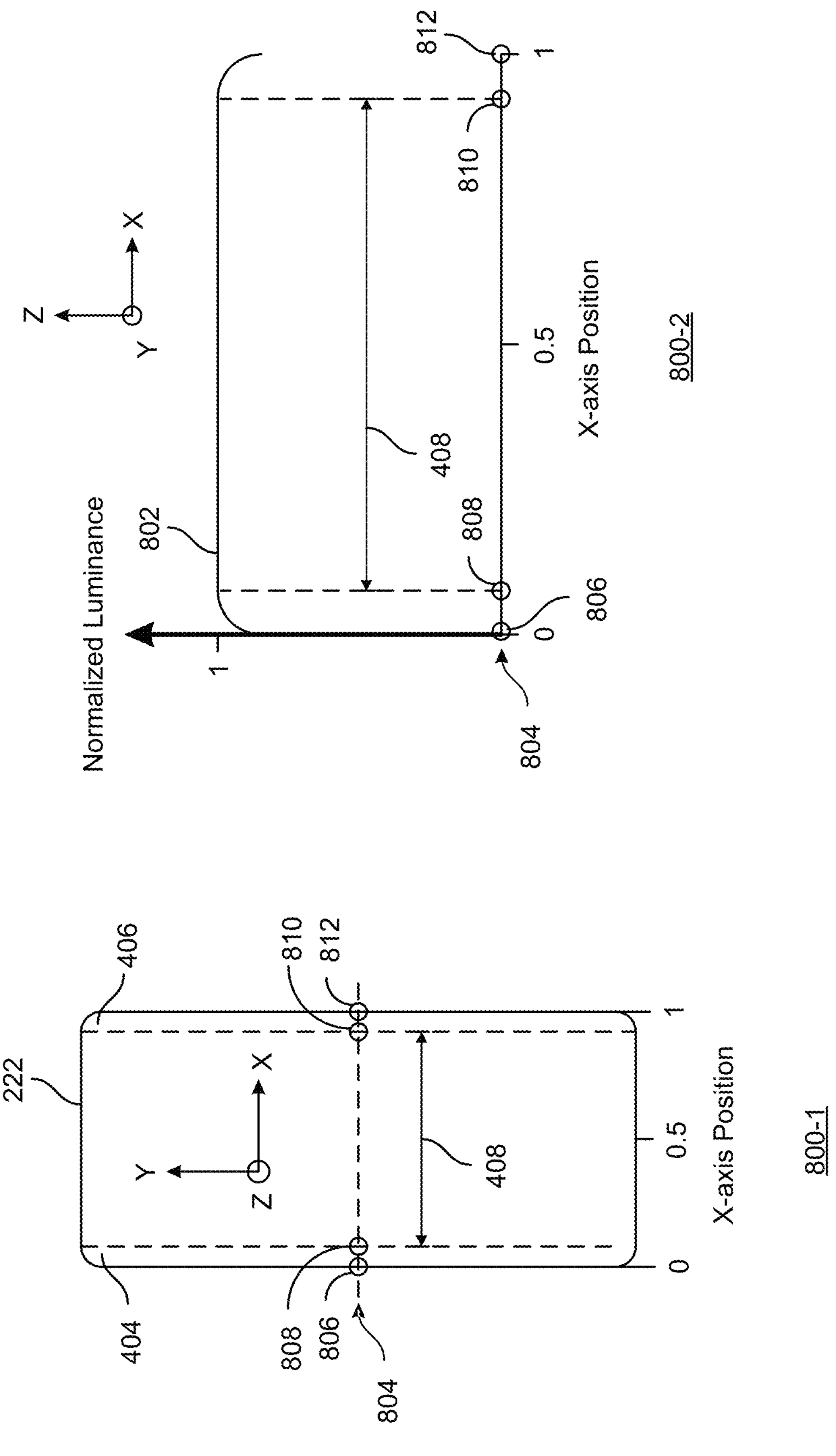
FIG. 8 relates an example normalized luminance to an example X axis position on which a user may focus when viewing the curved-edge display of the computing device from FIG. 4.

FIG. 8 illustrates a relationship between an example non-uniform luminance characteristic 802 and a point on the curved-edge OLED display 222 on which the user (e.g., user 602) focuses. Detail view 800-1 shows a top-down view of the computing device 102 having the curved edge OLED display 222 and a reference line 804, parallel to the X axis, that splits the display into a top half and a bottom half. Detail view 800-2 shows the example non-uniform luminance characteristic 802 versus a point on the curved-edge OLED display 222, along reference line 804, on which the user may focus. As shown, a reduced luminance (e.g., 86%) may be observed by the user who focuses on a left-most point 806 of the left curved edge 404 of the curved-edge OLED display 222. A maximum, or close to a maximum, luminance (e.g., 100%) may be observed by the user who focuses on a point adjacent to the left curved edge 808 or a point adjacent to the right curved edge 810, as well as any point in between. In addition to the left-most point 806, a reduced luminance may be observed by the user who focuses on a right-most point 812 of the right curved edge 406 of the curved-edge OLED display 222. Generally, the user, oriented perpendicular to the center of the plane of the flat center portion 408, may observe a maximum luminance, or close to a maximum luminance, by focusing on any point in the flat center portion 408 and a reduced luminance by focusing on any point in the curved portions 110 of the curved-edge OLED display 222.

Summarizing momentarily, FIGS. 4 and 5 show that the display of the computing device is manufactured as a curved-edge OLED display 222 having the flat center portion 408 and the curved portions 110 of a fixed bending radius (e.g., smaller fixed bending radius 508, larger fixed bending radius 510). FIGS. 6-8 illustrate that the user 602 may view the curved-edge OLED display 222 from various viewing distances (e.g., the closer distance 612, the farther distance 616) and various viewing angles (e.g., the perpendicular viewing angle 604, the sharp viewing angle 608), and observe various intensities of luminance (e.g., luminance 706, luminance 708). Also illustrated by FIGS. 6-8, the user 602 may generally observe the maximum luminance 702 at, or close to, a perpendicular viewing angle by focusing on any point in the flat center portion 408 of the curved-edge OLED display 222 and the reduced luminance at a viewing angle substantially less than 90 degrees by focusing on any point in the curved portions 110. Also shown, the user 602 may generally observe a reduced luminance, resulting from a sharper viewing angle, at a closer viewing distance and an increased luminance, resulting from a less sharp viewing angle, at a farther viewing distance. In some aspects, the luminance manager 106 may compensate dynamically for various viewing angles and viewing distances by utilizing eye track (or simply facial proximity) technology, optimizing the luminance compensation by knowing the position and viewing angle of the user 602 relative to the curved-edge OLED display 222.

Figure 9:
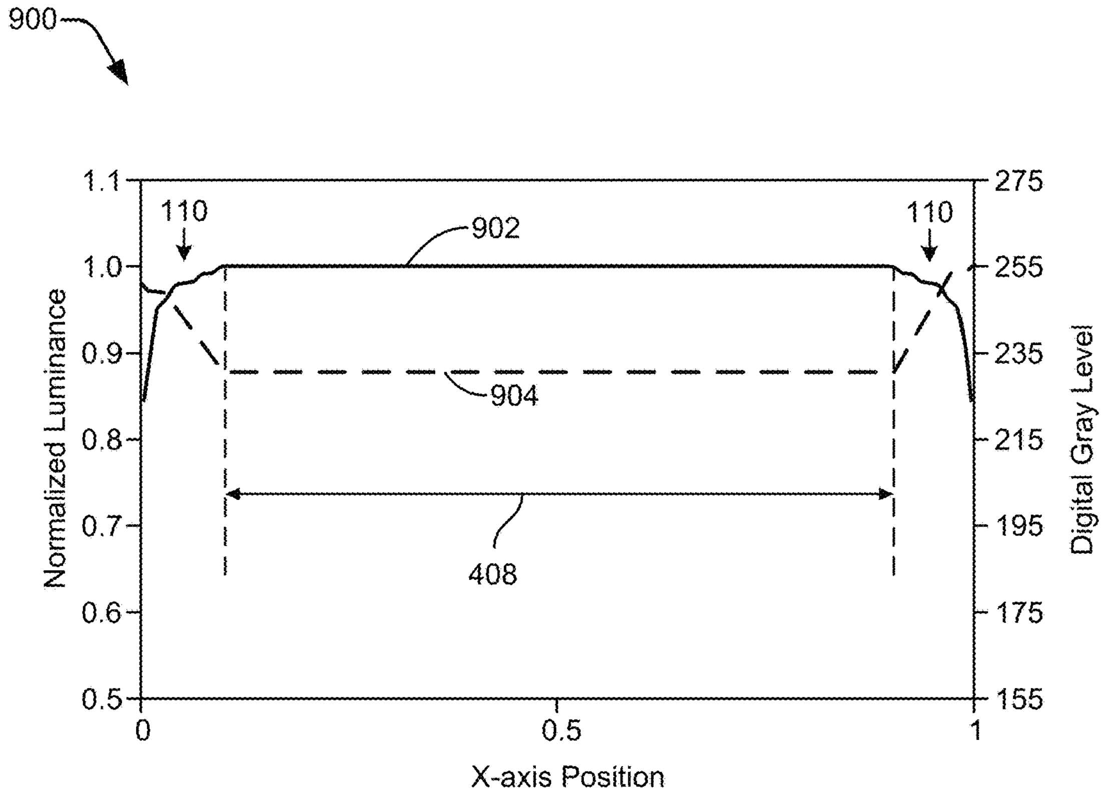
FIG. 9 illustrates an example implementation of an example computing device having a curved-edge display and a luminance manager configured to compensate for non-uniform luminance in curved-edge displays.
Figure 9:
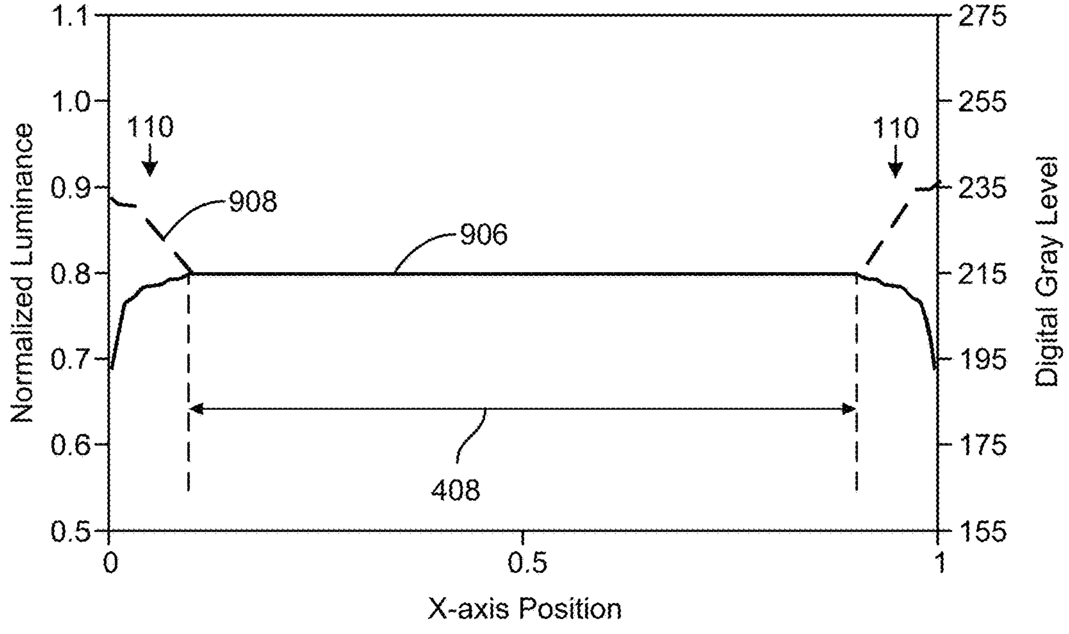

FIG. 9 illustrates an example implementation 900 of an example luminance manager 106 configured to compensate for non-uniform luminance in curved-edge displays. In this example, the luminance manager 106 receives an indication of a luminance that is intended to be displayed by pixels of the curved-edge OLED display 222 by scanning digital gray levels output by the DDIC 312 to various regions of the display (e.g., left curved edge 404, right curved edge 406, flat center portion 408). Furthermore, the luminance manager 106 receives a non-uniform luminance characteristic of the curved-edge OLED display 222, which describes how the luminance is perceived by a viewer (e.g., a user, a camera) due to angles at which light from the pixels is emitted. This characteristic can be compensated for by referencing the compensation map stored on the CRM 204, such as the lookup table mentioned previously. Based on the received indication of luminance and the non-uniform luminance characteristic, the luminance manager 106 determines a luminance modification for the pixels of the curved-edge OLED display 222.

Detail view 900-1 illustrates an example scenario in which the DDIC 312 directs the pixels of the curved-edge OLED display 222 to show on-screen content at a maximum digital gray level of 255 (e.g., G255). As shown, a user-perceived luminance 902 (e.g., a non-uniform luminance characteristic) for the pixels of the flat center portion 408 of the curved-edge OLED display 222 is a maximum luminance (e.g., a normalized luminance equal to one). Also shown by the user-perceived luminance 902, the luminance for the pixels of the curved portions 110 of the display are reduced (e.g., a normalized luminance less than one). Based on the user-perceived luminance 902, and because the display cannot emit a digital gray level greater than G255, the luminance manager determines a luminance modification 904 for the pixels of the curved-edge OLED display. As shown, the luminance modification 904 includes a luminance reduction, via lower digital gray levels, for the pixels of the flat center portion 408 and a luminance increase, via higher digital gray levels, for the pixels of the curved portions 110. As shown, the luminance increase determined by the luminance manager 106 is greater at farther edges of the curved portions 110 of the display than nearer edges of the curved portions 110 of the display. Here, the terms farther and nearer refer to a distance from the edge to a flat center portion of the display. That is, the nearer edge is closer to the flat center portion than the farther edge. By so doing, the luminance manager 106 compensates for the user-perceived luminance 902 present when on-screen content is G255.

The non-limiting example detailed in detail view 900-1, in which the luminance manager 106 determines, based on the user-perceived luminance 902, a luminance reduction for pixels of the display at the flat center portion 408 of the display may be generally described by Equation 1.

$$Gray_{flat} = \frac{Gray_{curve}}{\left(\frac{Luminance_{flat}}{Luminance_{curve}}\right)^{\frac{1}{2.2}}} \quad \text{Equation 1}$$

As shown, a target digital gray level ($Gray_{flat}$) for the flat center portion 408 of the display is a function of the curved portions 110 digital gray level ($Gray_{curve}$), a flat portion user-perceived luminance ($Luminance_{flat}$), a curved portion user-perceived luminance ($Luminance_{curve}$), and a gamma (e.g., gamma 2.2). The flat portion gray level may be a whole number value between zero and 255, inclusive. Both the flat portion and the curved portion user-perceived luminance, measured in nits, may be a value between zero and 2000, inclusive.

Detail view 900-2 illustrates an example scenario in which the DDIC 312 directs the pixels of the curved-edge OLED display 222 to show on-screen content at a less-than-maximum digital gray level (e.g., G215). As illustrated, a user-perceived luminance 906 for the pixels of the flat center portion 408 of the curved-edge OLED display 222 is a normalized luminance equal to 0.8. The user-perceived luminance 906 for the pixels of the curved portions 110 of the display is reduced below the normalized luminance equal to 0.8. Based on the user-perceived luminance 906, the luminance manager determines a luminance modification 908 for the pixels of the curved-edge OLED display 222. The luminance modification 908 includes no luminance modification for the pixels of the flat center portion 408 and a luminance increase, via higher digital gray levels, for the pixels of the curved portions 110 of the display. As shown, the luminance increase determined by the luminance manager 106 is greater at farther edges of the curved portions 110 of the display than nearer edges of the curved portions 110 of the display. Here, the terms farther and nearer refer to a distance from the edge to a flat center portion of the display. That is, the nearer edge is closer to the flat center portion than the farther edge. By so doing, the luminance manager 106 compensates for the user-perceived luminance 906 present when on-screen content is less than G255.

The non-limiting example detailed in detail view 900-2, in which the luminance manager 106 determines, based on the user-perceived luminance 906, a luminance increase for pixels of the display at the curved portions 110 of the display may be generally described by Equation 2.

$$Gray_{curve} = \min\left(Gray_{flat} * \left(\frac{Luminance_{flat}}{Luminance_{curve}}\right)^{\frac{1}{2.2}}, 255\right) \quad \text{Equation 2}$$

As shown, a target digital gray level ($Gray_{curve}$) for the curved portions 110 of the display is a function of a flat portion digital gray level ($Gray_{flat}$), a flat portion user-perceived luminance ($Luminance_{flat}$), a curved portion user-perceived luminance ($Luminance_{curve}$), a gamma (e.g., gamma 2.2), and a maximum digital gray level (e.g., G255). The flat portion gray level may be a whole number value between zero and 255, inclusive. Both the flat portion and the curved portion user-perceived luminance, measured in nits, may be a value between zero and 2000, inclusive. To account for a situation in which the luminance manager 106 determines that the target digital gray level for the curved portions 110 is greater than G255, the luminance manager 106 selects the minimum between the target digital gray value and G255.

In some aspects, the digital gray levels output by the DDIC 312 may be so low that a reduction in user-perceived luminance at the curved portions 110 of the curved-edge OLED display 222 is minimized. In such aspects, the luminance manager 106 may determine that a luminance modification is not necessary for the pixels at the curved portions 110 of the display. Alternatively, if the digital gray levels output by the DDIC 312 are slightly higher, the luminance manager 106 may determine that a luminance increase is necessary for the pixels at a farther edge of the curved portions 110 of the display and that no luminance modification is necessary for the pixels at a nearer edge of the curved portions 110 of the display. In so doing, the luminance manager 106 may save power while maintaining a good user experience when on-screen content is dimmer. Further still, the luminance manager 106 may dim or "turn off" pixels at the farther edge if it is not possible to modify their luminosity sufficient to create a desired user-perceived luminance consistency across the X axis. In such a case, modifying the luminance at the curved edge (e.g., shown at 908) may include a drop to zero for the digital gray level at the farther edge. An additional benefit to doing so is reduced power usage.

Although techniques herein have been described in reference to, or for use by, a curved-edge OLED display, at least some of the aforementioned techniques can also be implemented by other curved displays. Additionally, although techniques herein have been described in reference to, or for use by, a single computing device (e.g., computing device 102), the techniques are not limited to being implemented only on one computing device. Furthermore, although digital gray levels were described, the luminance manager 106 may compensate for non-uniform luminance in a variety of digital colors, including red, green, blue, a mixture of all three, and so forth.

Example Methods

Figure 10:
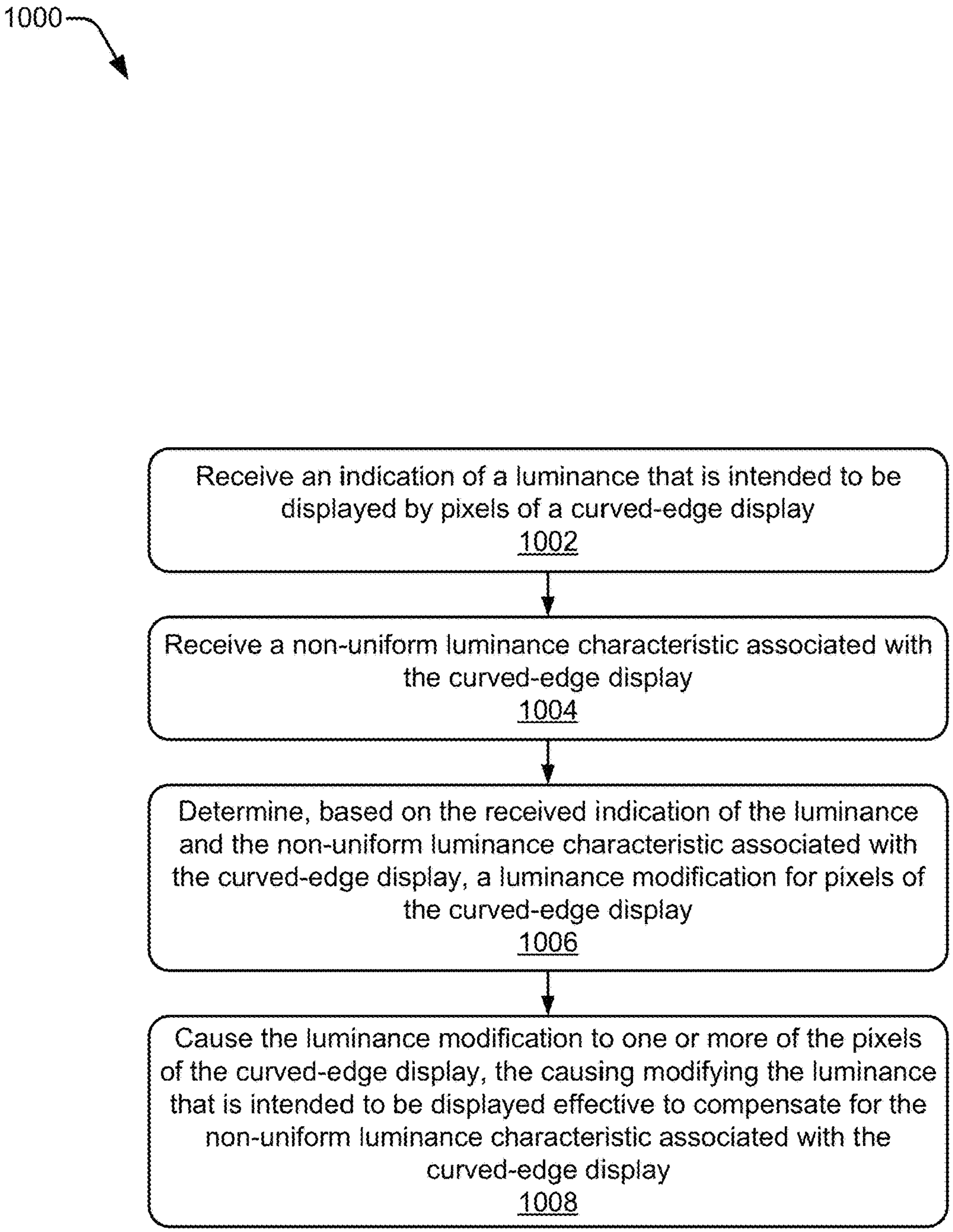
FIG. 10 depicts a method for compensating for non-uniform luminance in curved-edge displays.

FIG. 10 outlines method 1000 that enables compensation for non-uniform luminance in curved-edge displays. The method is shown as sets of blocks that specify operations performed but are not necessarily limited to the order or combinations shown for performing the operations by the respective blocks. Further, any of one or more of the operations may be repeated, combined, reorganized, or linked to provide a wide array of additional or alternate methods. In portions of the following discussion, reference may be made to the example implementation of FIG. 1 and details and examples in FIGS. 2-9, reference to which is made for example only. The techniques are not limited to performance by one entity or multiple entities operating on one device.

At 1002, a luminance manager (e.g., luminance manager 106) receives an indication of a luminance that is intended to be displayed by pixels of a curved-edge display. The luminance that is intended to be displayed may be an output of a DDIC (e.g., DDIC 312).

At 1004, the luminance manager receives a non-uniform luminance characteristic associated with the curved-edge display. As an example, the non-uniform luminance characteristic associated with the curved-edge display describes how the luminance is perceived by a viewer (e.g., a user, a camera). This non-uniform characteristic is due to angles at which light from the pixels is emitted.

At 1006, the luminance manager determines, based on the received indication of the luminance and the non-uniform luminance characteristic associated with the curved-edge display, a luminance modification for the pixels of the curved-edge display. For example, the luminance manager, using a variety of techniques (e.g., machine-learned techniques, empirically developed lookup tables), determines a luminance modification for the pixels of the curved-edge display. The determined luminance modification may be substantial or insubstantial, potentially corresponding to a digital gray level intended to be displayed by the pixels of the curved-edge display.

At 1008, the luminance manager causes the luminance modification to one or more of the pixels of the curved-edge display, the causing modifying the luminance that is displayed or modifying the intended luminance that is intended to be displayed. For example, the luminance manager may instruct a DDIC (e.g., DDIC 312) to modify a luminance displayed by one or more of the pixels of the curved-edge display via modified digital gray levels. The modified luminance by one or more of the pixels of the curved-edge display is effective at compensating for a non-uniform luminance in the curved-edge display.

EXAMPLES

In the following section, examples are provided.

Example 1: A method comprising: receiving an indication of a luminance that is intended to be displayed by pixels of a curved-edge display; receiving a non-uniform luminance characteristic associated with the curved-edge display; determining, based on the received indication of the luminance and the non-uniform luminance characteristic associated with the curved-edge display, a luminance modification for the pixels of the curved-edge display; and causing the luminance modification to one or more of the pixels of the curved-edge display, the causing modifying the luminance that is intended to be displayed effective to compensate for the non-uniform luminance characteristic associated with the curved-edge display.

Example 2: The method as described in any of the previous examples, wherein determining the luminance modification uses a lookup table correlating the indication of the luminance with the luminance modification.

Example 3: The method as described in any of the previous examples, wherein determining the luminance modification uses machine learning to determine the non-uniform luminance characteristic associated with the curved-edge display or the luminance modification.

Example 4: The method as described in any of the previous examples, wherein the non-uniform luminance characteristic associated with the curved-edge display is determined based on a reception of luminance of an on-axis sensor, the on-axis sensor oriented toward a center of a plane of a main portion of the curved-edge display.

Example 5: The method as described in any of the previous examples, wherein the on-axis sensor is a camera, the camera oriented perpendicular to a center of the plane of the main portion of the curved-edge display.

Example 6: The method as described in any of the previous examples, wherein the received indication of the luminance further comprises a near-curved-portion luminance, the near-curved-portion luminance for pixels of the curved-edge display not at the curved portion but near to or adjacent to the curved portion, and wherein the determining the luminance modification is further based on the near-curved-portion luminance.

Example 7: The method as described in any of the previous examples, wherein the determined luminance modification is a luminance increase for pixels at a curved portion of the curved-edge display.

Example 8: The method as described in example 7, wherein the determined luminance increase varies for different pixels of the pixels at the curved portion, the determined luminance increase greater at a farther edge of the curved portion of the display than at a nearer edge of the curved portion of the display.

Example 9: The method as described in example 8, wherein the determined luminance increase at the farther edge is beyond a maximum luminance of the curved-edge display, and further comprising not applying the determined luminance increase at the farther edge.

Example 10: The method as described in example 8, wherein the determined luminance increase at the farther edge is beyond a maximum luminance of the curved-edge display, and further comprising determining a luminance decrease for a main portion of the curved-edge display and a reduced luminance increase at the farther edge, the reduced luminance increase not beyond the maximum luminance of the curved-edge display.

Example 11: The method as described in example 8, wherein the determined luminance increase at the farther edge is beyond a maximum luminance of a center portion of the curved-edge display and not beyond a maximum luminance of the curved portion, the curved portion having a higher maximum luminance than the center portion.

Example 12: The method as described in example 8, wherein the determined luminance increase at the farther edge is beyond a maximum luminance of the curved-edge display, and further comprising causing a luminance decrease at the farther edge.

Example 13: The method as described in example 12, wherein causing the luminance to decrease turns off or substantially reduces the luminance at the farther edge.

Example 14: A computing device comprising: a curved-edge display; one or more processors; and memory storing: instructions that, when executed by the one or more processors, cause the one or more processors to implement a luminance manager to provide compensation for a non-uniform luminance characteristic associated with the curved-edge display, by performing the method of any one of the preceding examples.

Example 15: Computer-readable media comprising instructions that, when executed by one or more processors, cause the one or more processors to carry out the method of any of examples 1 to 14.

CONCLUSION

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying Drawings and terms discussed herein may be indicative of one or more items or terms, and thus reference may be made interchangeably to single or plural forms of the items and terms in this written description.

Although implementations of systems and techniques of, and apparatuses enabling, compensating for non-uniform luminance in curved-edge displays have been described in language specific to certain features and/or methods, the subject of the appended Claims is not necessarily limited to the specific features or methods described. Rather, the specific features and methods are disclosed as example implementations of compensating for non-uniform luminance in curved-edge displays.

What is claimed is:

1. A method comprising:

receiving an indication of a luminance that is intended to be displayed by pixels of a curved-edge display;

receiving a non-uniform luminance characteristic associated with the curved-edge display;

determining, based on the received indication of the luminance and the non-uniform luminance characteristic associated with the curved-edge display, a luminance modification for the pixels of the curved-edge display, the determined luminance modification including a luminance increase for pixels at a curved portion of the curved-edge display relative to the luminance of the pixels at a flat portion of the curved-edge display, the determined luminance increase greater at a farther edge of the curved portion of the display than at a nearer edge of the curved portion of the display, the determined luminance increase for pixels at the farther edge of the curved portion of the curved-edge display is beyond a maximum luminance of the curved-edge display;

determining a luminance decrease for pixels at the flat portion of the curved-edge display;

determining a reduced luminance increase for the pixels at the farther edge of the curved portion of the curved-edge display, the reduced luminance increase not beyond the maximum luminance of the curved-edge display; and modifying the indication of luminance for the pixels at the curved portion of the curved-edge display with the luminance modification to compensate for the non-uniform luminance characteristic associated with the curved-edge display.

2. The method as described in claim 1, further comprising:

displaying the modified indication of luminance by the pixels of the curved-edge display.

3. The method as described in claim 1, wherein determining the luminance modification uses machine learning to determine the non-uniform luminance characteristic associated with the curved-edge display.

4. The method as described in claim 1, wherein the non-uniform luminance characteristic associated with the curved-edge display is determined based on a reception of luminance of an on-axis sensor, the on-axis sensor oriented toward a center of a plane of a flat portion of the curved-edge display.

5. The method as described in claim 4, wherein the on-axis sensor is a camera, the camera oriented perpendicular to a center of the plane of the flat portion of the curved-edge display.

6. The method as described in claim 1, wherein the received indication of the luminance further comprises a near-curved-portion luminance, the near-curved-portion luminance for pixels of the curved-edge display not at the curved portion but near to or adjacent to the curved portion, and wherein the determining the luminance modification is further based on the near-curved-portion luminance.

7. The method as described in claim 1, wherein the determined luminance increase varies for different pixels of the pixels at the curved portion.

8. The method as described in claim 1, further comprising not applying the determined luminance increase at the farther edge.

9. The method as described in claim 1, wherein the determined luminance increase at the farther edge is beyond a maximum luminance of a center portion of the curved-edge display and not beyond a maximum luminance of the curved portion, the curved portion having a higher maximum luminance than the center portion.

10. The method as described in claim 1, further comprising causing a luminance decrease at the farther edge.

11. The method as described in claim 10, wherein causing the luminance to decrease turns off or substantially reduces the luminance at the farther edge.

12. The method as described in claim 1, wherein determining the luminance modification uses machine learning to determine the luminance modification.

13. The method as described in claim 1, further comprising at least one of:

modifying the indication of luminance for the pixels at the flat portion of the curved-edge display with the luminance decrease; or wherein determining a luminance modification for the pixels of the curved-edge display is based on a lookup table that correlates indications of luminance with non-uniform luminance characteristics.

14. A computing device comprising:

a curved-edge display;

one or more processors; and memory storing instructions that, when executed by the one or more processors, cause the one or more processors to implement a luminance manager operable to:

receive an indication of a luminance that is intended to be displayed by pixels of the curved-edge display;

receive a non-uniform luminance characteristic associated with the curved-edge display;

determine, based on the received indication of the luminance and the non-uniform luminance characteristic associated with the curved-edge display, a luminance modification for the pixels of the curved-edge display, the determined luminance modification including a luminance increase for pixels at a curved portion of the curved-edge display relative to the luminance of the pixels at a flat portion of the curved-edge display, the determined luminance increase greater at a farther edge of the curved portion of the display than at a nearer edge of the curved portion of the display;

compare the determined luminance increase for pixels at the farther edge of the curved portion of the curved-edge display to a maximum luminance of the curved-edge display;

responsive to a determination that the determined luminance increase for pixels at the farther edge of the curved portion of the curved-edge display is beyond the maximum luminance of the curved-edge display:

determine a luminance decrease for pixels at the flat portion of the curved-edge display; and determine a reduced luminance increase for the pixels at the farther edge of the curved portion of the curved-edge display, the reduced luminance increase not beyond the maximum luminance of the curved-edge display; and modify the indication of luminance for the pixels at the curved portion of the curved-edge display with the luminance modification to compensate for the non-uniform luminance characteristic associated with the curved-edge display.

15. The computing device of claim 14, further comprising:

display the modified indication of luminance by the pixels of the curved-edge display.

16. The computing device of claim 14, wherein the luminance manager is further operable to use machine learning to determine the non-uniform luminance characteristic associated with the curved-edge display or the luminance modification.

17. The computing device of claim 14, wherein:

the non-uniform luminance characteristic associated with the curved-edge display is determined based on a reception of luminance of an on-axis sensor oriented toward a center of a plane of a flat portion of the curved-edge display; and the on-axis sensor is a camera oriented perpendicular to a center of the plane of the flat portion of the curved-edge display.

18. The computing device of claim 14, wherein:

the received indication of the luminance further comprises a near-curved-portion luminance for pixels of the curved-edge display not at the curved portion but near to or adjacent to the curved portion; and the luminance manager is further operable to determine the luminance modification further based on the near-curved-portion luminance.

19. The computing device of claim 14, wherein:

the determined luminance increase varies for different pixels of the pixels at the curved portion.

20. The computing device as described in claim 14, further comprising at least one of:

wherein the luminance manager is further operable to modify the indication of luminance for the pixels at the flat portion of the curved-edge display with the luminance decrease; or wherein the luminance modification for the pixels of the curved-edge display is determined based on a lookup table that correlates indications of luminance with non-uniform luminance characteristics.

21. A computer-readable medium comprising instructions which, when executed by one or more processors, cause the one or more processors to perform operations including:

receiving an indication of a luminance that is intended to be displayed by pixels of a curved-edge display;

receiving a non-uniform luminance characteristic associated with the curved-edge display;

determining, based on the received indication of the luminance and the non-uniform luminance characteristic associated with the curved-edge display, a luminance modification for the pixels of the curved-edge display, the determined luminance modification including a luminance increase for pixels at a curved portion of the curved-edge display relative to the luminance of the pixels at a flat portion of the curved-edge display, the determined luminance increase greater at a farther edge of the curved portion of the display than at a nearer edge of the curved portion of the display;

comparing the determined luminance increase for pixels at the farther edge of the curved portion of the curved-edge display to a maximum luminance of the curved-edge display;

responsive to a determination that the determined luminance increase for pixels at the farther edge of the curved portion of the curved-edge display is beyond the maximum luminance of the curved-edge display:

determining a luminance decrease for pixels at the flat portion of the curved-edge display; and determining a reduced luminance increase for the pixels at the farther edge of the curved portion of the curved-edge display, the reduced luminance increase not beyond the maximum luminance of the curved-edge display; and modifying the indication of luminance for the pixels at the curved portion of the curved-edge display with the luminance modification to compensate for the non-uniform luminance characteristic associated with the curved-edge display.

22. The computer-readable medium as described in claim 21, further comprising at least one of:

modifying the indication of luminance for the pixels at the flat portion of the curved-edge display with the luminance decrease; or wherein determining a luminance modification for the pixels of the curved-edge display is based on a lookup table that correlates indications of luminance with non-uniform luminance characteristics.

* * * * *